US007085257B1

(12) United States Patent
Karves et al.

(10) Patent No.: US 7,085,257 B1
(45) Date of Patent: Aug. 1, 2006

(54) METHOD AND SYSTEM FOR MAKING ACCESSIBLE WIRELESSLY A NETWORK PHONEBOOK AND JOURNAL DATABASE

(75) Inventors: Heidi Karves, Tampere (FI); Eeva-Liisa Heinonen, Tampere (FI); Jaakko Itavaara, Kirkkonummi (FI); Kai Kronstrom, Tampere (FI); Kari Lehtinen, Tampere (FI); Jari Mononen, Ruutana (FI); Petri Nykänen, Tampere (FI); Mikko Virtanen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/544,141

(22) Filed: Apr. 6, 2000

(51) Int. Cl.
*H04L 12/66* (2006.01)
*H04M 3/42* (2006.01)

(52) U.S. Cl. ...................... 370/352; 455/415

(58) Field of Classification Search ............... 370/351, 370/352, 328; 374/142.09, 142, 142.02; 455/556, 518, 415
See application file for complete search history.

(56) References Cited

U.S. PATENT DOCUMENTS 5,689,547 A * 11/1997 Molne ......................... 379/58
6,005,927 A * 12/1999 Rahrer et al. ............... 455/415
6,018,668 A * 1/2000 Schmidt ...................... 455/518
6,047,053 A    4/2000 Miner et al.
6,343,120 B1 * 1/2002 Rhodes ....................... 379/142
6,449,351 B1 * 9/2002 Moss et al. ............. 379/142.09
6,459,780 B1 * 10/2002 Wurster et al. ......... 379/142.02
6,516,203 B1 * 2/2003 Enzmann et al. ........... 455/556
6,662,006 B1 * 12/2003 Glass .......................... 455/415
2003/0147518 A1 * 8/2003 Albal et al. ............... 379/88.19

FOREIGN PATENT DOCUMENTS

CA         2161506 A      4/1997

* cited by examiner

*Primary Examiner*—Steven Nguyen
(74) *Attorney, Agent, or Firm*—Banner & Witcoff, Ltd.

(57) ABSTRACT

There is disclosed a method and system to provide a wireless terminal online access capability to a system phonebook, such as a WLAN, which calls for instructing the system to start a phonebook application such that for incoming calls the phonebook application commences in response to a phone number identification at the user terminal side and for outgoing calls the phonebook application commences through a User Interface (UI) of the user terminal; and performing a search query of the phonebook database to identify a caller corresponding to a phone number identification of an incoming call and/or at least one of a phone number and person or party of the call to be initiated.

43 Claims, 11 Drawing Sheets

FIG. 8
Network Phonebook
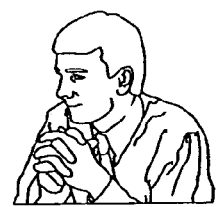
Barclay, John V.
Sales and Marketing
P.O. Box 144, Huntington, USA
 134 662287
Hart, Roy B.
Sales and Marketing
P.O. Box 144, Huntington, USA
 134 664568
Kingsley, Edward J.
Sales and Marketing
P.O. Box 144, Huntington, USA
 134 6799345
Lincoln, Jason T.
Sales and Marketing
P.O. Box 78, Hampsville, USA
 134 662773
O'Hara, Heidi F.
Sales and Marketing
P.O. Box 78, Hampsville, USA
 134 678776

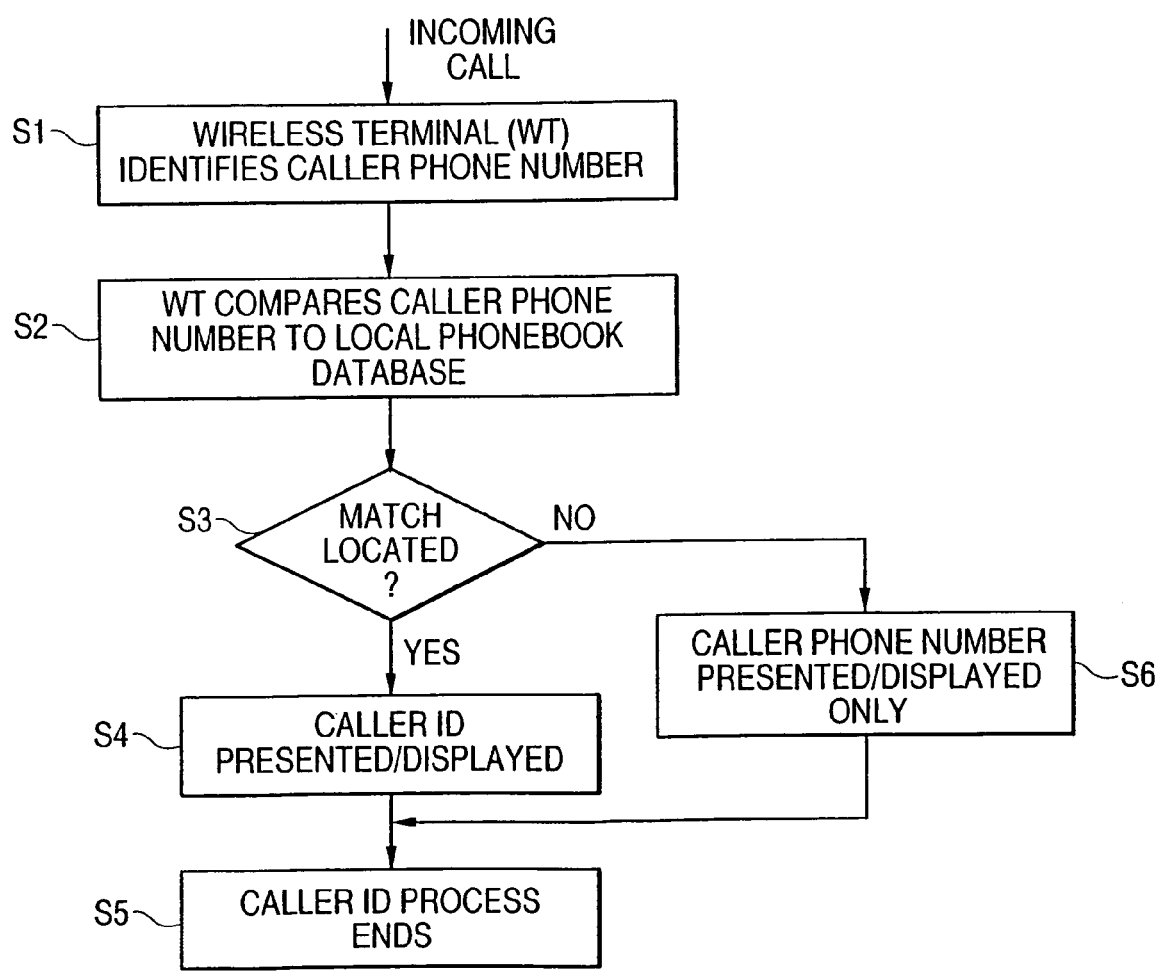

METHOD AND SYSTEM FOR MAKING ACCESSIBLE WIRELESSLY A NETWORK PHONEBOOK AND JOURNAL DATABASE

FIELD OF THE INVENTION

This invention relates, generally, to the field of Value Added Services (VAS) and, more particularly, to online use of a system or network phonebook and to providing caller background information on incoming/outgoing calls based on journal viewing.

BACKGROUND OF THE INVENTION

The ever increasing reliance on networking among competing businesses in the free market and the meteoric or growth of the internet and online services are strong evidences to the benefits of shared data and shared resources. Increasingly, companies, corporations, organizations or associations and the like are finding more and more that wireless communication and, particularly, Wireless Local Area Networks (WLANs) are an indispensable addition to the more traditional wired local area networks (wired LANs) to satisfy the needs for mobility, relocation, ad hoc networking, and coverage of locations difficult to wire. Through the benefits of wireless LANs (WLANs), wireless terminal users can access shared information without having to find a plug-in for their terminal and on the management side, networks can be set up or augmented without having to install new wirings or alter previously installed wirings. With wireless LANS, advantages in convenience as well as in improved productivity and reduced future costs over traditional wired networks are evident.

The wireless LAN is completely transparent to the user, exactly like the wired LAN, but without the limitations of having to be physically hooked up to a wired connection. In a wireless LAN environment, your office is where your wireless terminal is located such as a wireless phone, Personal Digital Assistance (PDA), a palmtop device, and a portable computer such as a notebook/laptop computer which operates wirelessly and which may also have a phone hookup capability.

Traditionally, company phonebooks which have been available electronically to company personnel have been done so through the facility of a web browser on a Personal Computer (PC) such as a desktop connected to the wired LAN. Under such a wired scheme, a company employee, for example, can only access numbers that are stored centrally, for example, using a shared drive, while locally stored numbers (within the user's database) cannot be accessed easily through the network. That is, conventionally, one can access a remotely located phonebook information in a communication system such as a company network using a PC connected to the network with a separate contacts application, as in MICROSOFT OUTLOOK. However, such phonebook application is not tightly integrated with access to the local phonebook information at the user's terminal. Moreover, such contacts application has been typically used more so for storage or viewing of E-mail addresses rather than to access phone numbers and to initiate calls.

Another earlier developed scheme pertains to the SPT 1700 Product Family developed by Symbol Technologies, Inc. That is, this product family is directed to products including Voice over Internet Protocol (VoIP) capabilities in which the terminal user can make an outgoing call by locating the personal Internet Protocol (IP) number of the person or party to be called which is stored in the local memory in the wireless phone database. In such a product family, the information is stored into the local database, namely, into the wireless phone database, for example, by himself or herself. Although there are other more current wireless terminal products, which have even much greater storage capability in the local database, a phonebook database is, basically, limited to that available in the local phonebook, namely, in the wireless terminal database.

Another prior known scheme is the CISCO CALLMANAGER such as VERSION 2.4. The Cisco CallManager software has a number of integrated voice applications that perform voice conferencing, manual Web attendant console, a click-to-call function and other functions. In addition, a MICROSOFT WINDOWS TAPI (Telepathy Applications Programming Interface) is available for the Cisco active phonebook, which has a click-to-call function and a browsable directory. In accordance with this active phonebook application, one can place a call or reply to a call or put the call on hold from a PC. Typically, according to such a scheme, the PC user would wear a headset for voice communication while browsing the screen on the PC, which is wired to the network. Solutions like the CISCO ACTIVE PHONEBOOK relate to schemes in which a call comes through the 'The Data World' over the intranet/internet and only voice communication and needed controls are performed by the voice terminal, namely, the user phone. For example, with regard to a phonebook directory, one can connect his or her PDA or a palm phone to the serial port of his or her PC and download phone numbers, addresses, E-mail addresses, and other contact information from the network to the database of the PDA or palm phone for later use, namely, when the phone or PDA is in the wireless mode. That is, such phonebook information is downloaded to a local database while in an offline connection with the network. Such downloading of information would require considerable storage space in the local database (associated with the wireless terminal). In addition to consuming a large amount of local storage space, the information that is stored locally does not remain up-to-date for too long.

In most modern office Private Branch Exchanges (PBXs), there are kept records of outgoing calls. Some PBXs can be equipped with call tracking software which enables also tracking of incoming calls. In helpdesk kind of phone software equipment, the information on incoming calls is stored in customer databases. In most cases this kind of information can only be viewed on user's PC screen. The biggest drawback related to the traditional way of viewing call related data is the fact that such type of call tracking software always requires a PC (wired to the network). Further, there is another drawback, namely, it is not possible to view additional online data such as tasks, E-mails and documents related to originating or terminating calls and the like, simultaneously. As an example, a wireless Digital European Cordless Telecommunication (DECT) phone such as with regard to Alcatel's PBX equipment shows the number/name of caller, date and time of call and call duration associated with the last 20 calls. However, in addition to limiting the view to only the last 20 calls, the calls cannot be sorted on the basis of the caller.

FIG. 13 illustrates an example of a conventional incoming call identification process associated with a wireless terminal in a wireless LAN. In this example, the wireless terminal has a database which stores phonebook information—although limited by the size of the storage database. The stored information is either inputted by the wireless terminal user (owner) and/or downloaded through an offline connection to a network PC. In accordance with such a scheme, when the wireless terminal has an incoming call, it identifies the phone number of the caller through a caller line identification process at the terminal side (S1 in FIG. 13) and compares this phone number to the phonebook database that is stored locally in the user terminal (S2). If this comparison leads to a match (S3), the caller name is displayed on the wireless terminal screen (S4) whereby the caller ID process ends (S5). If a match is not found, only the caller phone number is displayed at the user terminal (S6) and the caller ID process ends.

This conventional approach has similar drawbacks as that earlier discussed. For one, the user has to enter the number and/or any other contact information in the local phonebook (e.g., the user terminal database) before making the call. Further, the wireless terminal or handset, typically, does not have enough memory to handle/store the entire company (network) phonebook. Moreover, the phonebook and/or any background information which may have been previously stored in a database may no longer be accurate due to a continual updating of the server/databases by the network.

SUMMARY OF THE INVENTION

The present invention is directed to providing a wireless terminal user online access to a phonebook database and, moreover, online access to a journal database which contains background information directed to an incoming call or an outgoing call in a communication system including in connection with a Wireless LAN (WLAN) that substantially obviates problems arising from limitations and disadvantages of prior known schemes including that discussed hereinabove.

In wireless terminals that have the facility of a user interface (UI) to access information stored in a network such as a wireless local area network (WLAN), it is highly desirable to provide the end users easy and instant access to phonebook information stored in the network. The intention is to provide consistent access to both local (offline) and remote (online) phonebooks. The local phonebook relates to information stored in a local database such as the local memory in the wireless user terminal and the remote phonebook is associated with a system or network such as in a WLAN database. This access is to be easy and, also, to provide the terminal user the option to automatically copy accessed/selected remote phonebook entries to the user terminal phonebook for later use and access offline.

It is a featured aspect of the invention to provide the terminal user a wireless online access to a phonebook database. Access to the network is enabled wirelessly, for example, by WLAN. The phonebook may be located in the local network and the wireless terminal is operably connected to the network.

In accordance with a method and system therefor of the invention, the user terminal has wireless online access to the phonebook database, such as with regard to a company phonebook, at the time of either incoming phone calls to the user terminal or outgoing calls to be made by the terminal user. For incoming phone calls to the wireless terminal, the invention, according to one aspect, calls for a caller line phone number identification process at the wireless terminal and on the basis of a phone number identification instructing the system, which may be wireless LAN, calls for searching the phonebook database to identify the name of the caller and to send results of the search to the user terminal such that if the caller identity search is successful, identification of the caller is presented at the wireless terminal, and if the caller identify search is not successful, the phone number is presented only at the wireless terminal. In accordance with the inventive featured aspect directed to outgoing calls to be made wirelessly, from the user terminal, the invention calls for instructing the system, which may be a wireless LAN, to search the appropriate network database to locate a phone number and/or person or party to be called and to send results of that search to the wireless terminal. With regard to the outgoing call to be made, if the phone number/destination of the call to be made is found in the network database, the same is presented at the wireless terminal, and if the phone number/destination is not found during an initial search query of the phonebook database, the wireless terminal user, optionally, may modify the search query to the phonebook database, for example, through making new or modified search queries until the phone numbers and/or destination (person or party) of the call to be made is found or until the terminal user decides to terminate the identification process.

According to a further aspect of the invention, a protocol application is employed to allow communication between the wireless terminal and the system or network, the protocol application may be a Wireless Application Protocol (WAP), a Hypertext Transfer Protocol (HTTP) and a Lightweight Directory Access Protocol (LDAP), although not limited thereto.

According to another inventive aspect of the present invention, the method and system therefor also calls for a journal viewing application in which the communication system, which may be a wireless LAN, searches a journal database for background information associated with at least one of a caller of an incoming phone call and a phone number or person/party of an outgoing call to be made and sends results of the background information search to the wireless terminal. Both the phonebook application as well as the journal viewing application can be effected using a common protocol application and, therefore, a common transport interface, for example, a WAP interface, a HTTP interface, or a LDAP interface, although not limited thereto.

Both the phonebook application as well as the journal viewing application may be associated with an infrastructure such as in connection with a wireless LAN which may have a few or a large number of wireless terminals, one or more access points and a wired backbone. In accordance with such a scheme, the phonebook/journal database is provided in the network and may be accessed through a server associated with the network. Each wireless terminal may have a user interface such as for allowing the terminal user to interact with the network. Examples of user interfaces are command-line interfaces, menu-driven interfaces, and graphical user interfaces, although not limited thereto.

The online linkup between the user terminal and a wireless LAN may be while the terminal user is within the area covered by the wireless LAN or may be outside the area covered by the wireless LAN, in which case, communication with the network may be over the internet.

The information stored in the phonebook database may include phone numbers of office phones, facsimile phones, cell and mobile phones, pagers and handheld devices including Personal Digital Assistance (PDAs) and palm units with and without voice capability and may also have contact addresses and terminal addresses including E-mail addresses of desktop and portable computers and the like, which are some examples of information which may be contained in the phonebook database. Additionally, the phonebook information held in the database may include name and profile information of personnel/clients of a company or corporation, a company plant, or organization/association and the like, as some examples, although not limited thereto.

The background information associated with the journal viewing application, which is available from the journal database of the system, such as a wireless LAN, may maintain an ongoing record of previous phone calls, originating and terminating, including dates, times and durations; prior E-mails (both incoming and outgoing associated with a caller); task lists; documents associated with originating or terminating calls; a project; a calendar date; and a company or plant associated with originating or terminating call, as some examples, although not limited thereto.

In accordance with the present invention, a phone call can be initiated from the network server, having access to the phonebook database, as easily as from the local phonebook, namely, at the user terminal. Also, this network phonebook service can automatically add numbers to the local phonebook in accordance with the user's choice and, moreover, the terminal user is able to browse through the phonebook while having, at the same time, an active phone call.

Still further, with regard to a method and system therefor of obtaining background information, such as, through effecting a journal viewing application, the background information presented at the wireless terminal side, which may be browsed by the user, may be filtered and presented in an organized fashion including with headings, as selected by the terminal user.

The following represent current ways of obtaining a phone number that is not stored in the local phonebook, e.g. a wireless terminal database. Traditionally, assistance may be sought through making a phone call for directory assistance. This type of personalized service can be costly, rather slow and could not be used during a meeting since it would be disruptive. A second way to locate a phone call may be by searching through a telephone directory or catalogue. This would always require an up-to-date catalogue however, typically, most mobile phone numbers are not included in catalogues (telephone directories). A third way to locate a phone number is to simply look it up on one's PC from the company network phonebook. However, as noted earlier, this requires a PC and, moreover, one is not able to make instant phone calls from most presently existing PCs.

The present invention, on the other hand, does not require the user to be bound to a certain location such as a PC which is connected to a wired backbone to get the needed information. The phonebook, according to the present invention, is always wirelessly and instantly accessible by the user terminal. In accordance with conventional schemes, in most cases, the user has to enter the phone number in his/her terminal before making the call or storing the contact information in the local phonebook. The network phonebook in accordance with the present invention is an integrated approach such that from an end user perspective, calling from a network phonebook is as easy as calling from the local phonebook at the user terminal side.

Regarding the journal viewing application, a main benefit thereof is the instant, easy accessibility to real-time background information from the network database in contradistinction to the traditional way to manually enter the journal database. In accordance with the present invention, the terminal user has online access to an existing database and can, therefore, easily keep track of information related to his or her incoming/outgoing calls. Further, in addition to receiving basic call information, for example, on the viewing screen of the handheld terminal, the user will be able to keep all desired/necessary call related information arranged in an organized fashion as well as obtain that information more quickly and easier than that previously typically available. Background information obtained instantly is particularly important and advantageous to company personnel such as sales people, service personnel and others who are regularly in direct contact with clients and who need access to related and relevant data pertaining to callers of incoming calls as well as persons or contacts associated with outgoing calls.

A drawback with the traditional way of viewing call related data is that the call tracking software associated therewith requires a PC. Another drawback is that according to traditional approaches, one cannot view additional online information such as tasks, prior E-mails, documents related to a project associated with a caller or person to be called. Compared to the traditional way of manually entering information into the journal database, a main benefit of the present invention is the ability to obtain instant and easy access to the journal database. Also, information pertaining to prior correspondences with the caller or person to be called is provided always at the right time just when it is needed, namely, at the time of the incoming call as well as at the time of initiating call. Moreover, as in the phonebook application, terminal users needing call related information need not be situated where there is PC. Also, by using a hands-free facility such as a headset for voice communication, the terminal user can access or browse through call related data in the handheld device, for example, when speaking. This additional value added service or journal viewing application is able to keep track of all outgoing and incoming calls during time periods selected by the user.

The above set forth and other featured aspects of the invention are made more apparent and are further described in the ensuing detailed description of example embodiments and the claims when read in connection with the accompanying drawings, all forming a part of the disclosure of this invention. While the foregoing and following illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings wherein:

BRIEF DESCRIPTION OF THE DRAWINGS

FIG. 8 is an example of a system/network phonebook application viewer screen of a user terminal showing names, phone numbers and other related information along with pictures of the individuals matched to a phonebook search query;

FIG. 13 is a flowchart of a conventional method for providing a wireless terminal access to a network phonebook database.

DETAILED DESCRIPTION OF THE INVENTION

The present invention is directed to providing the terminal user a wireless online access to a phonebook database as well as to a journal database with regard to a company or corporation, a company plant or organization/association and the like. Value Added Services (VASs) are implemented as part of a communication system such as a Wireless LAN (WLAN). Under the WLAN system, access to the network is effected wirelessly. In accordance with the present invention, through utilizing a company wireless LAN infrastructure, the intranet and the internet, terminal users roaming within a corporate system and the like or, for that matter, located outside the range of the company wireless LAN infrastructure, can still access a company network database. WLANs offer fast and easy access to wired corporate LANs and their services. A wireless LAN can be implemented as an extension to the existing amount of information that needs to be carried over the network. In effect, in a WLAN environment, one's office is where one's laptop/wireless terminal is. This is particularly true for business personnel whose work takes them away from the office as well as for company sales and service personnel and the like whose job description requires regular contacts with clients and other office professionals.

Wireless LAN systems can provide wireless terminal users with access to real-time information anywhere in the company or organization. This mobility supports productivity and service opportunities which are not otherwise possible with wired networks. For example, in a number of environments there is a role for wireless LAN as an alternative to a wired LAN and/or as an adjunct to a wired LAN. In most instances, an organization or company will also have a wired LAN to support servers in some stationary work stations. For example, there may be a backbone wired LAN, such as Ethernet, and the like, supporting servers, work stations, and one or more bridges or routers to linkup with other networks. Such wired support is referred to as an infrastructure or backbone wired LAN. Wireless LAN systems are also highly scalable. That is, a wireless LAN can be configured to fit a variety of topologies to meet the needs of specific applications and installations. Configurations are easily changed and range from peer-to-peer networks suitable for a small number of users to full infrastructure networks of many thousands of users that allows roaming over a broad area. By utilizing the existing wired LAN, the intranet and the internet, users have fast-online access to the resources in the network.

Figure 1:
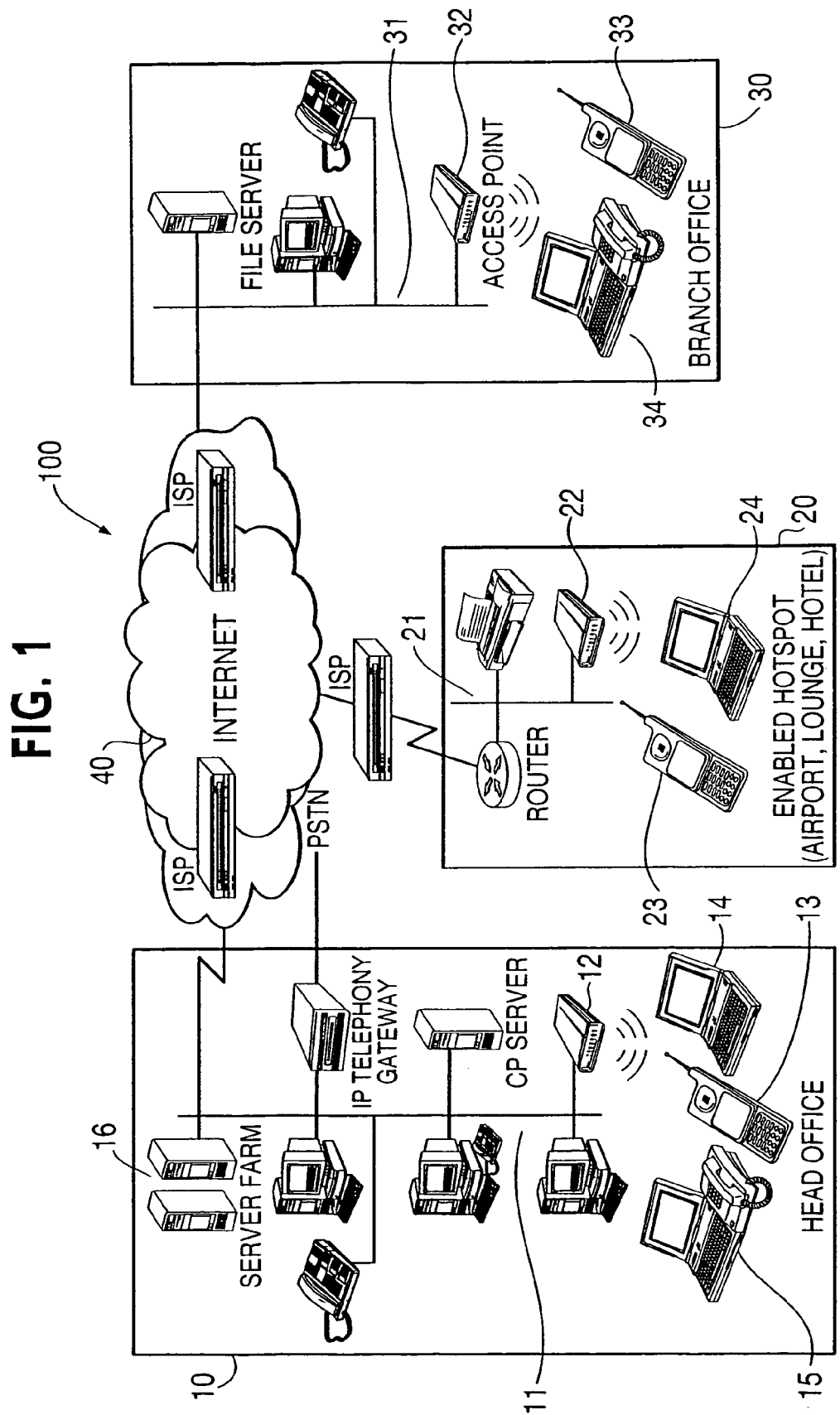
FIG. 1 is a system diagram showing examples of networks according to the present invention.

An example embodiment that will be used to illustrate the various examples of the present invention is an embodiment where the communication system contains or may be a network and the network is a wireless LAN. FIG. 1 is a diagram of an example of networks applicable to the present invention. These example networks are Wireless LANS (WLANs). In infrastructure WLANs, multiple access points link the WLAN to the wired network and allow users to efficiently share network resources. The access points not only provide communication with the wired network (intranet) but also mediate wireless network traffic in the immediate neighborhood, i.e. the area covered by the individual access points. Multiple access points can provide wireless coverage for an entire building or a campus facility.

With regard to the FIG. 1 embodiment, WLAN access points 12, 22 and 32 provide wireless access to WLANs 11, 21 and 31, respectively, for wireless terminals. Wireless terminals 13, 14 and 15 are connected to WLAN 11 via access point 12. Wireless terminals 23 and 24 are connected to WLAN 21 via access point 22 while wireless terminals 33 and 34 are connected to WLAN 31 via access point 32. Wireless terminals such as 13, 14, 15, 23, 24, 33 and 34 may be any wireless device used for communication including but not limited to a wireless telephone, a Personal Digital Assistant (PDA), a palm top device, and a portable computer with wireless capability such as a notebook or laptop computer and which may have phone hookup capability such as to connect a headphone to allow browsing the computer screen while at the same time communicating by voice. Voice communication may be effected through Voice over Internet Protocol (VoIP) such as that conforming to the International Telecommunications Union (ITU) standards for internet telepathy, namely, standard H.323.

If a terminal is outside of the network coverage area of all the access points on the wireless LAN, the terminal does not have direct access to the WLAN. Although in this example telecommunication system, only one access point is illustrated as being included in each of the WLANs 11, 21 and 31, each such WLAN may have several or large number of access points to effect connectivity between all of the wireless terminals that are distributed throughout the WLAN. In the example given in FIG. 1, WLAN 11 is associated with a head office building, for example, of a company. Other company buildings which may be located in other geographic areas, such as branch office 30, in FIG. 1, may have its own WLAN for its own campus. The access points are typically situated in strategically convenient locations within and/or outside of campus buildings so as to allow the wireless terminals to have connection to the WLAN everywhere in the campus. Access points have limited ranges, typically, from 100 to 300 or more feet range within which a wireless terminal must be in order to be connected to the WLAN. However, other buildings or locations that are not part of a company such as airports, hotels, etc., may have one or more access points that do allow wireless terminals access to a WLAN associated therewith, for example, WLAN 21 in FIG. 1, which has the ability through some other method of communicating with other WLANs, e.g., via the internet 40. Also, communication may occur between WLANs of a company that are located in different buildings in different geographic areas such as over the internet. For example, wireless terminal 13, connected to WLAN 11 at the head office 10, may communicate via access point 12 to WLAN 11, to the internet 40, and then to WLAN 31 at the branch office building 30, located in the different geographic area. Communication between different wireless phones, for example, which are respectively associated with different WLANs may communicate with each other over the internet through VoIP where the voice signals are transferred using the internet protocol rather than through normal wired telephone connections such as Private Branch Exchanges (PBXs) and Public Switched Telephone Network (PSTN).

Figure 2:
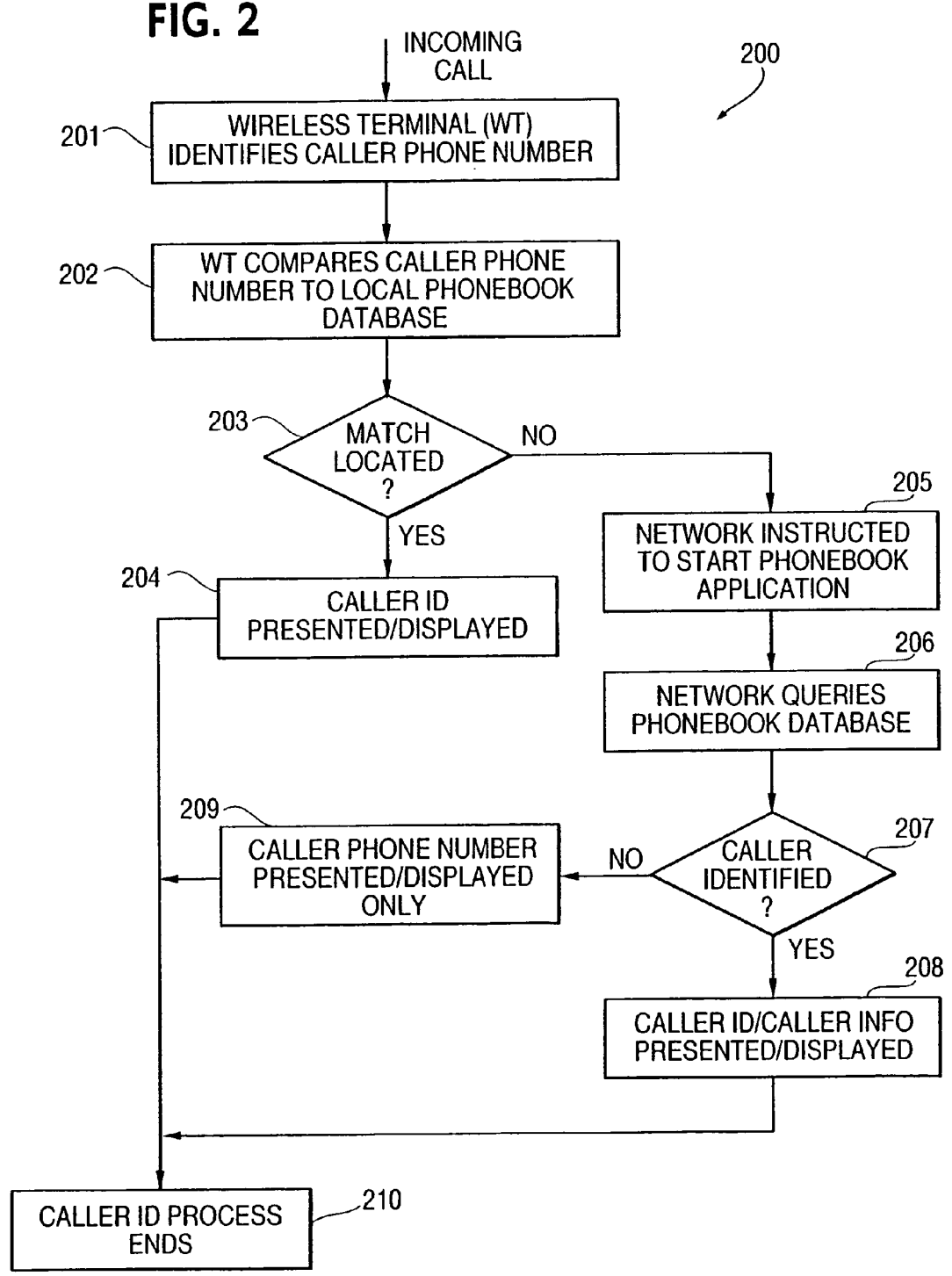
FIG. 2 is a flowchart of a first example of a method for providing a wireless terminal access to a phonebook database of a system or network according to the present invention.

FIG. 2 of the drawings illustrates a flowchart of one example of implementing a phonebook application in a system including a network such as a WLAN in connection with incoming calls to a wireless terminal. This example is being illustrated to show how the present invention, in connection with incoming calls, is an improvement over a prior known scheme such as the conventional approach discussed earlier with regard to FIG. 13 of the drawings. It is emphasized, the phonebook application, according to the present invention, is such that the wireless terminal user can easily select on the User Interface (UI) the phonebook that is to be shown. Assuming that the user terminal has a database which acts like a local phonebook database, the terminal user can select through the UI program in the terminal a setting such that for incoming and/or outgoing calls, the phonebook application includes (i) sending search queries only to the local database, (ii) sending search queries to the remote network phonebook database when the local phonebook search query is unsuccessful, (iii) sending search queries directly to the remote phonebook database which is, typically, server accessed at the network or (iv) simultaneously, sending search queries to both the locally stored phonebook and to the network phonebook. In the process 200 illustrated in FIG. 2, the network application directed to the network phonebook commences when a search query associated with the local phonebook is not successful.

When the wireless terminal has an incoming call, the caller line identification process at the terminal identifies the caller phone number (201) and compares this phone number to the local phonebook database in the user terminal (202). If this comparison leads to a match (203), the caller name is displayed on the wireless terminal screen (204) and the caller name ID process ends (210). If the comparison does not lead to a match at the local phonebook side, the phonebook application is automatically redirected to the network side (205) in which case the network queries the phonebook database (206). If the search in the network phonebook leads to a match (207), the caller name is presented at the wireless terminal (208) whereby the caller ID process ends (210).

The identification of a caller of an incoming call and, also, with regard to a person or party to be called may include both a name and affiliation of the person including profile information such as business card information including position in a client firm or company and the like. The incoming call may be either another employee of the same company or person or party directed to a client or other business contact. Further, the caller ID information presented at the user terminal side may also include background information along with the caller name identification. The process involving obtaining background information of calls (for both incoming and outgoing calls) will be discussed later with regard to FIGS. 6 and 7 of the drawings. If the network phonebook searching does not lead to caller name identification, then similarly as with regard to S4 in FIG. 1, the caller phone number is presented/displayed only at the user terminal (209) in which case the caller ID process ends.

Figure 3:
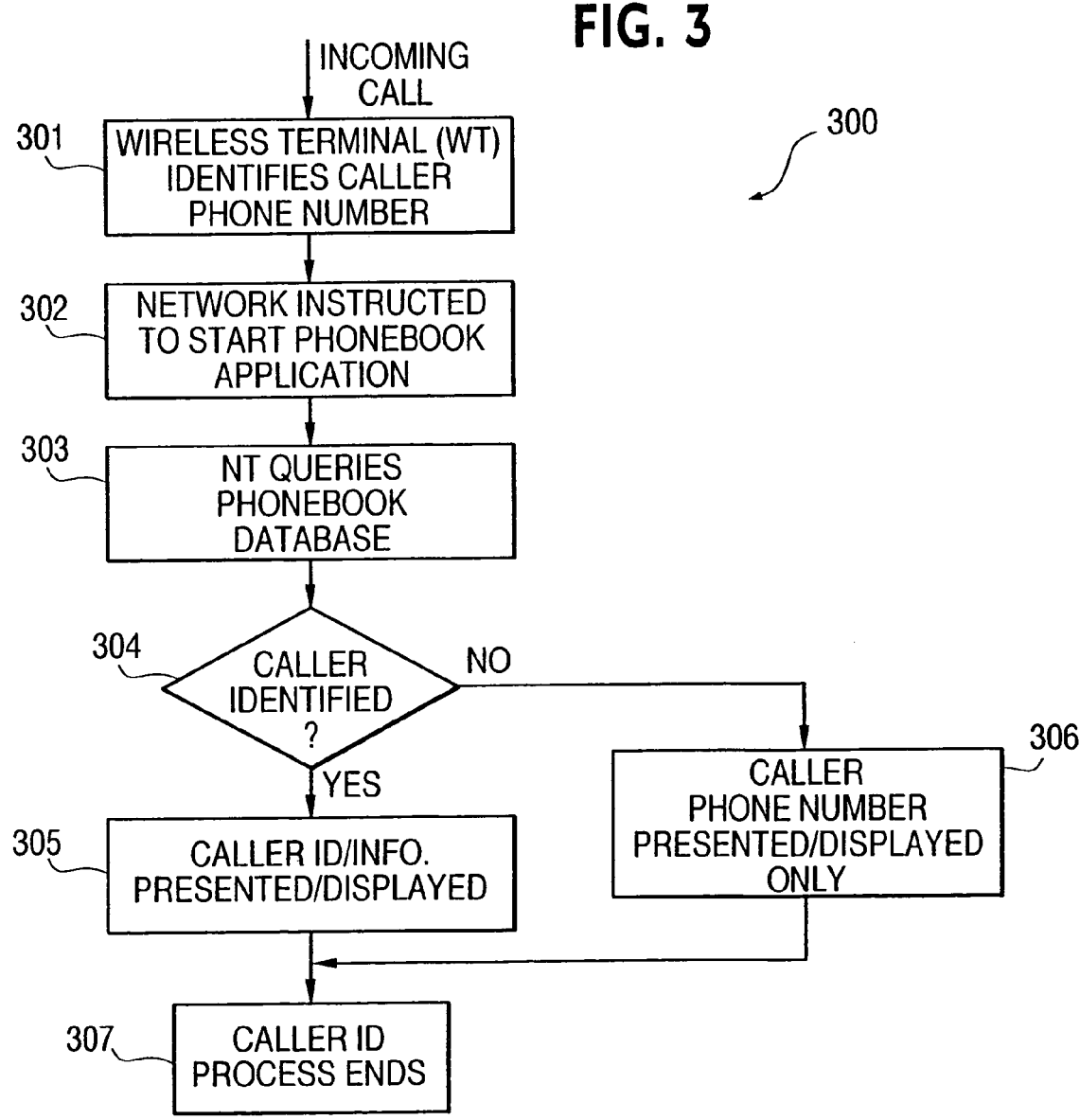
FIG. 3 is a flowchart of a second example of a method for providing a wireless terminal access to a phonebook database of a system or network according to the present invention.

FIG. 3 of the drawings illustrates a second example of providing wireless access to a user terminal of, for example, the network phonebook. The process 300 involved is similar to that in FIG. 2 except that with regard to the method according to FIG. 3, the terminal user has instructed via the UI that the phonebook application is to search only the network phonebook. In this connection, the process involving 301, 302, 303, 304, 305, 306 and 307 correspond to that in FIG. 2 but, however, without the processes involving 202, 203 and 204 in FIG. 2.

As further examples of effecting the phonebook application process involving the network phonebook database, FIGS. 4 and 5 will now be discussed.

Figure 4:
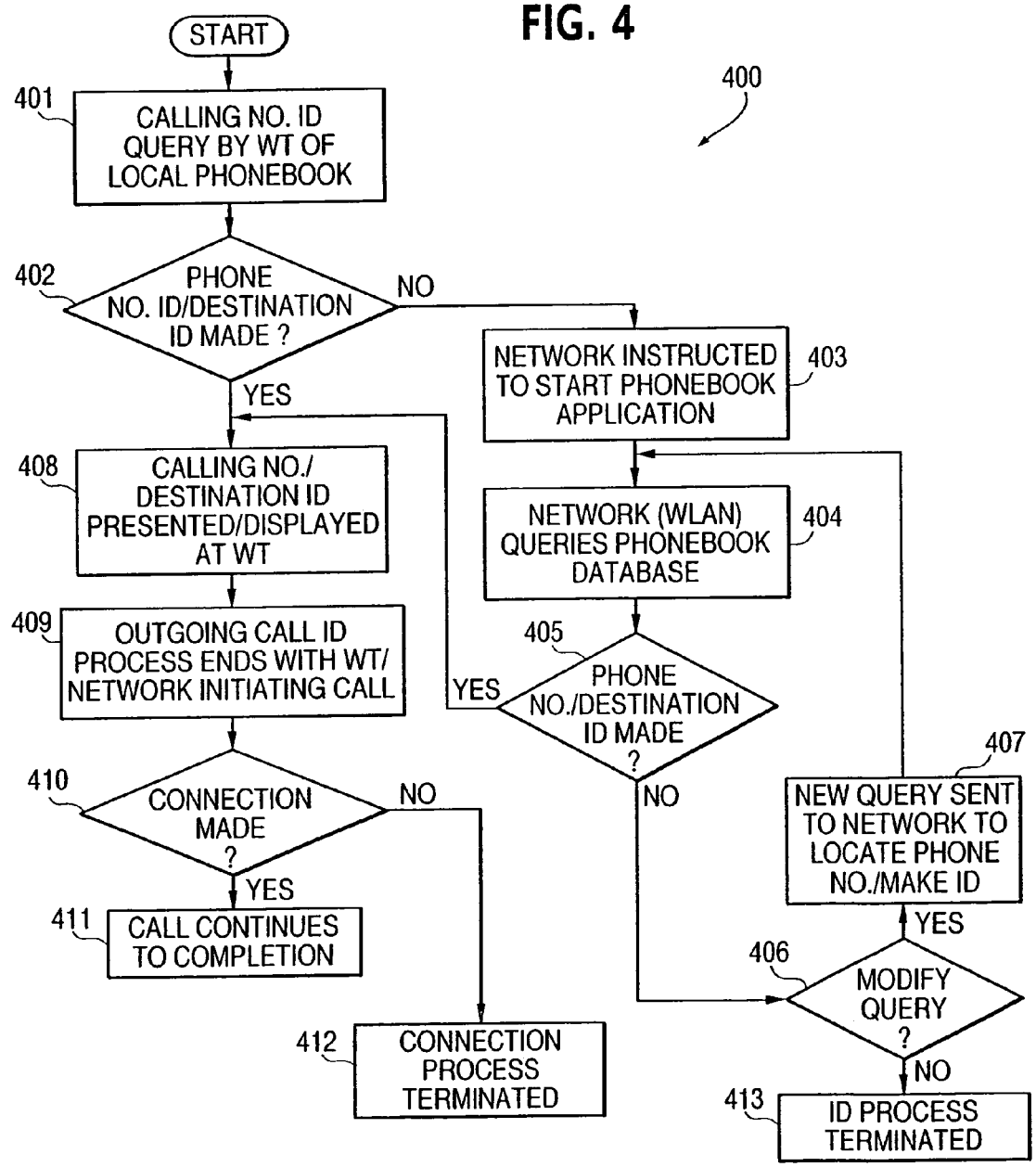
FIG. 4 is a flowchart of a third example of a method for providing a wireless terminal access to a phonebook database of a system or network according to the present invention.

FIG. 4 illustrates a third example of wirelessly accessing, for example, a network phonebook via a user terminal in connection with an outgoing call to be made. The process 400 in FIG. 4 is similar to process 200 in FIG. 2 in respect to the setting selected by the user on the UI of the wireless terminal, namely, the phonebook application is set so as to query first the local phonebook associated with the user terminal. If an identification (ID) is not made of the person or party to be called through searching the local phonebook database, the phonebook application is reverted to the network side.

It is emphasized, in a communication system such as a wireless LAN, in order for the benefits associated with wireless accessing of the network phonebook as well as wireless accessing of the network journal database (which will be described later) to be fully realized, the wireless terminal should be continuously maintained in the network without interruption except, for example, when the network or system servers are down such as for servicing. Such continuous online accessibility is somewhat different from that compared to normal cellular phones/devices that work, typically, in a circuit switch mode such as PBX and PSTN.

In accordance with the present invention, the phonebook application can be implemented by employing an additional or separate phonebook application or can be provided as a Value Added Service (VAS) to the existing protocol applications available in the device. When implementing the phonebook application as, for example, a separate WLAN phonebook service, the phonebook application is extended in such a way that it can access a remote phonebook from the same UI as that used for accessing the local phonebook at the user terminal. An example of achieving this is through employing an application protocol or software protocol known as Lightweight Directory Access Protocol (LDAP) which enables anyone to locate organizations, individuals and other resources such as files and devices in a network, whether on the internet or on a corporate intranet. This software protocol also works on Transmission Control Protocol/Internet Protocol (TCP/IP) which is used for communications between computers as well as being a standard for data transmission over networks, including the internet. LDAP is a "lightweight" (smaller amount of code) version of Directory Access Protocol (DAP), which is part of X.500, a standard for directory services in a network. This specialized phonebooks/contacts application, although other forms of proprietary protocols may be used, is discussed further with regard to the embodiment in FIG. 12 of the drawings.

According to conventional approaches for locating phonebook information/contact information, accessing of such phonebook information is through using a PC, which is wired to the company network, and employing a separate contacts application, for example, the contacts application in MICROSOFT OUTLOOK. However, as discussed earlier, such accessing into the network is not fully integrated with accessing to the local phonebook database. Also, the conventional approach has typically been used more so for storage/viewing of E-mail addresses rather than accessing of phone numbers such as to initiate outgoing calls.

When the present invention is implemented as a value added service, the local phonebook at the user interface as well as the remote phonebook located in, for example, a network database may be accessed using either a World Wide Web (WWW) or Web browser which is Hypertext Markup Language (HTML) based. Alternatively, the protocol application can be a Wireless Application Protocol (WAP) based phonebook application using a WAP browser which is Wireless Markup Language (WML) based. Using either the former or the latter, forms may be built so that both the local phonebook and remote phonebook can both be browsed. According to this approach, the local phonebook at the user terminal can be accessed using the browser even if there is no access to the remotely located WWW (web) or WAP server. A local phonebook browsing connection is an offline connection from that of the wireless LAN. Therefore, in order to effect such dual browsing capability by the user terminal, a cache memory may be used at the wireless terminal side. Additional discussion regarding web/WAP browsing will be made with regard to the embodiments in FIGS. 11 and 12 of the drawings.

Conventionally, as discussed above, remotely located phonebook information in the network can be accessed using a PC wired to the network using, for example, a Web browser. However, unlike in specialized contacts application such as LDAP application, such accessing is not integrated at all to the accessing of the local phonebook information in the PC. Moreover, when a PC user is web browsed, a phone call must be initiated elsewhere. Discussion will now turn back to the network phonebook application shown in FIG. 4 of the drawings.

The flowchart in FIG. 4 represents an example of wirelessly accessing a phonebook database of a system such as a wireless LAN in connection with an outgoing call to be made. When a wireless terminal user wants to initiate an outgoing call, of a person who is within that network or outside the network such as a client or professional contact, the user who has access to that wireless terminal makes a selection on the UI at the terminal that, in the case of process 400 in FIG. 4, the local phonebook at the terminal is first queried to locate the number or name of a person or party to be called (401). If the search at the local phonebook database is unsuccessful then the search is automatically reverted to the network phonebook in which case the network is instructed to start a phonebook application (403) for the services of, for example, a network server having access to the phonebook database (404). If the phone number and/or destination (e.g., person or party) of the call to be made is located in the database (405), the same is presented at the user terminal (408). If, however, the phone number and/or destination is not found during the initial search query of the network phonebook database (405), the wireless terminal user, optionally, may modify the query (406) to the network phonebook through successively making one or more new or modified search queries until the phone number of person or party of the call to be made is located (407) or until a terminal user decides to terminate the identification process (413). If a phone number and/or name of person or party regarding the call to be made is found in the network phonebook (405), the phone number/destination ID is then presented/displayed at the user terminal with an available picture, in the network phonebook, of the person named or associated with the located phone number, as one example. High end handheld terminals that have fairly large size screens are able to display a picture of the person to be called, in addition to other information related to that person. With the presenting/displaying at the user terminal the phonebook information directed to the person or party to be called, the outgoing call ID process ends with the call being initiated at the network side (409), and when a phone connection is made (with the receiving end of the initiated call accepting the connection) (410), the call continues to completion (411). If the connection is not made, for example, because the receiving end of the call is busy or has not kept his or her line open, the connection process is terminated for the time being (412).

With regard to process 400 in FIG. 4, if the initial phonebook application query to the local phonebook database at the user's side is successful (402), the calling number and/or destination ID are presented/displayed at the user terminal (408) and the process continues with the wireless terminal initiating the call, through the network, based on the number located from the local phonebook. If the receiving end accepts the call, the connection is made (410) and the call continues to completion (411), otherwise the connection process is terminated (412). To reiterate, the phonebook application process requires the facility of a user interface (UI) and the like at the wireless terminal end.

Typically, in company networks including wireless LANs, access to the company database is, typically, through a secured online access including user authentication and authorization and data encryption. The network may have a security firewall as well as encryption solution for terminal users for outside the area covered by the access points of the network so as to allow communication with the network through other means such as over the internet.

Turning back to the phonebook database, the type of information that may be held therein may be phone numbers, addresses, name and picture, if available, and profile information of personnel/clients of a company or corporation, a company plant, or organization/association and the like. As to the phone numbers held in the phonebook database, they can be phone numbers of office phones, facsimile phones, cell and mobile phones, pagers and handheld devices including Personal Digital Assistance (PDAs) and palm units with and without a voice capability. The contact addresses of clients/personnel may be terminal addresses including E-mail addresses of desktop and portable computers and the like. The phone application search query may have one or more items from the following list, although not limited thereto: a name and contact information including address, phone number(s), facsimile number(s), an E-mail address and the like; a title of person in company/organization; a unit, plant or branch of company; a project group or work team; a building/site location; picture of person; and a person's administrative assistant. Of course, this pertains to search queries associated with outgoing calls to be made. As to identifying caller names of incoming calls, the phonebook application at the local phonebook database (at the user terminal side) simply compares the incoming call phone number with the phone numbers in that database to locate the caller name and any other pertinent information such as the caller's business card.

Figure 5:
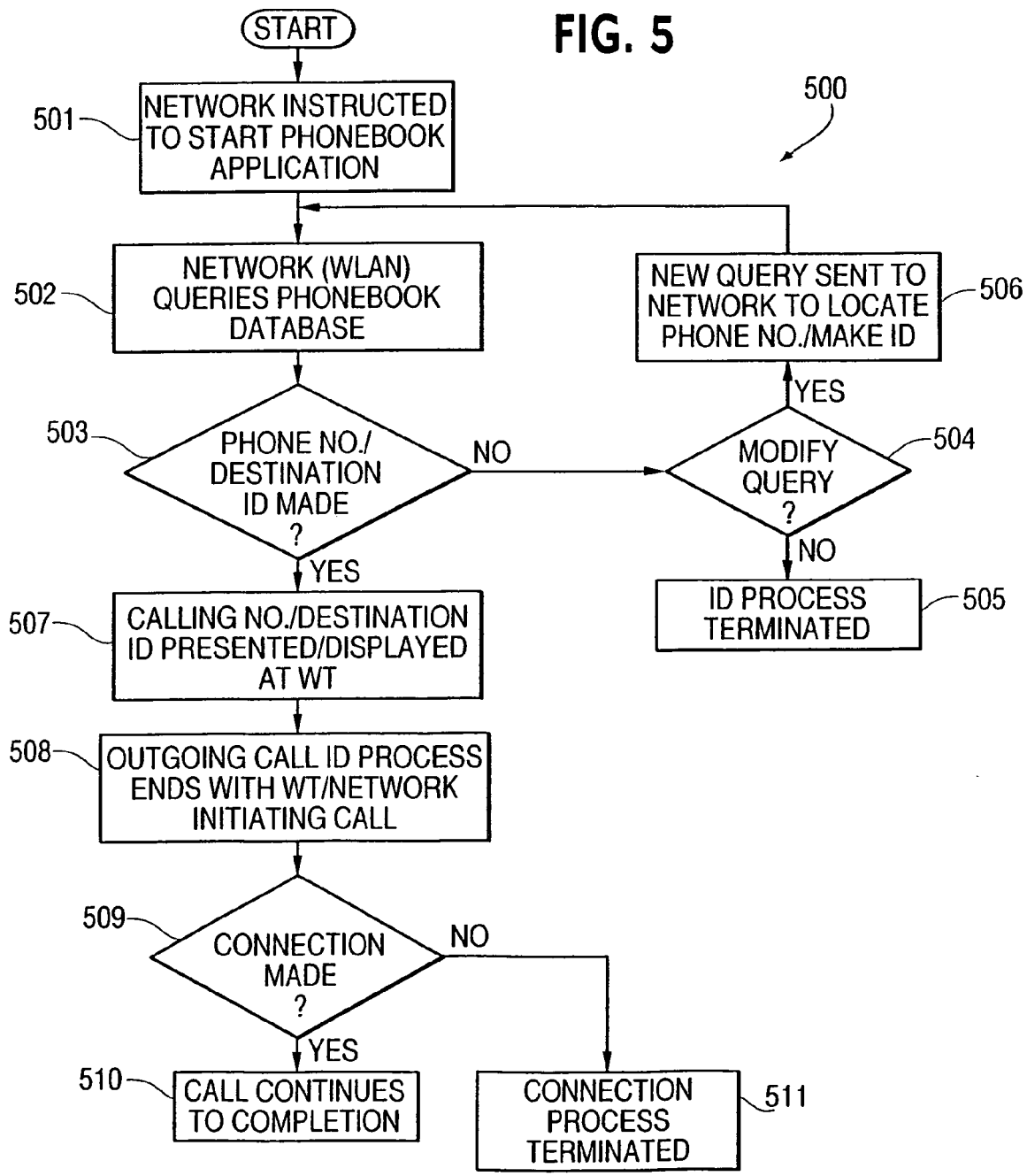
FIG. 5 is a flowchart of a fourth example of a method for providing a wireless terminal access to a phonebook database of a system or network according to the present invention.

FIG. 5 of the drawings shows a process 500 which is another example of a method for online accessing a network phonebook by a user terminal. Unlike process 400 in FIG. 4, FIG. 5 directs the phonebook application only to the network phonebook and not first to the local phonebook at the user terminal database. Alternative, the phonebook application can be applied through the user terminal to both the local as well as to the remote phonebook at the network, simultaneously. Therefore, insofar as relating the process 500 in FIG. 5 to that of the process 400 in FIG. 4, 501–511 are similar to that of 403–413 shown in FIG. 4 of the drawings. Therefore, since the discussion pertaining to 403–413 according to the process in FIG. 4 is also applicable to that of 501–511 of the process 500 in FIG. 5, no further discussion of FIG. 5 is given for purposes of brevity.

In addition to a phonebook application, the invention further features a journal viewing application in which the communication system such as a network and, more particularly, a wireless LAN provides background information wirelessly to a user terminal. This accessing of background information is provided to the terminal user at the time he needs the information, for example, at the time of an incoming call as well as when a terminal user wants to initiate an outgoing call. That is, the relevant background information obtained from the journal database is instantly available at the time of an incoming call as well as at the time of initiating an outgoing call.

Figure 6:
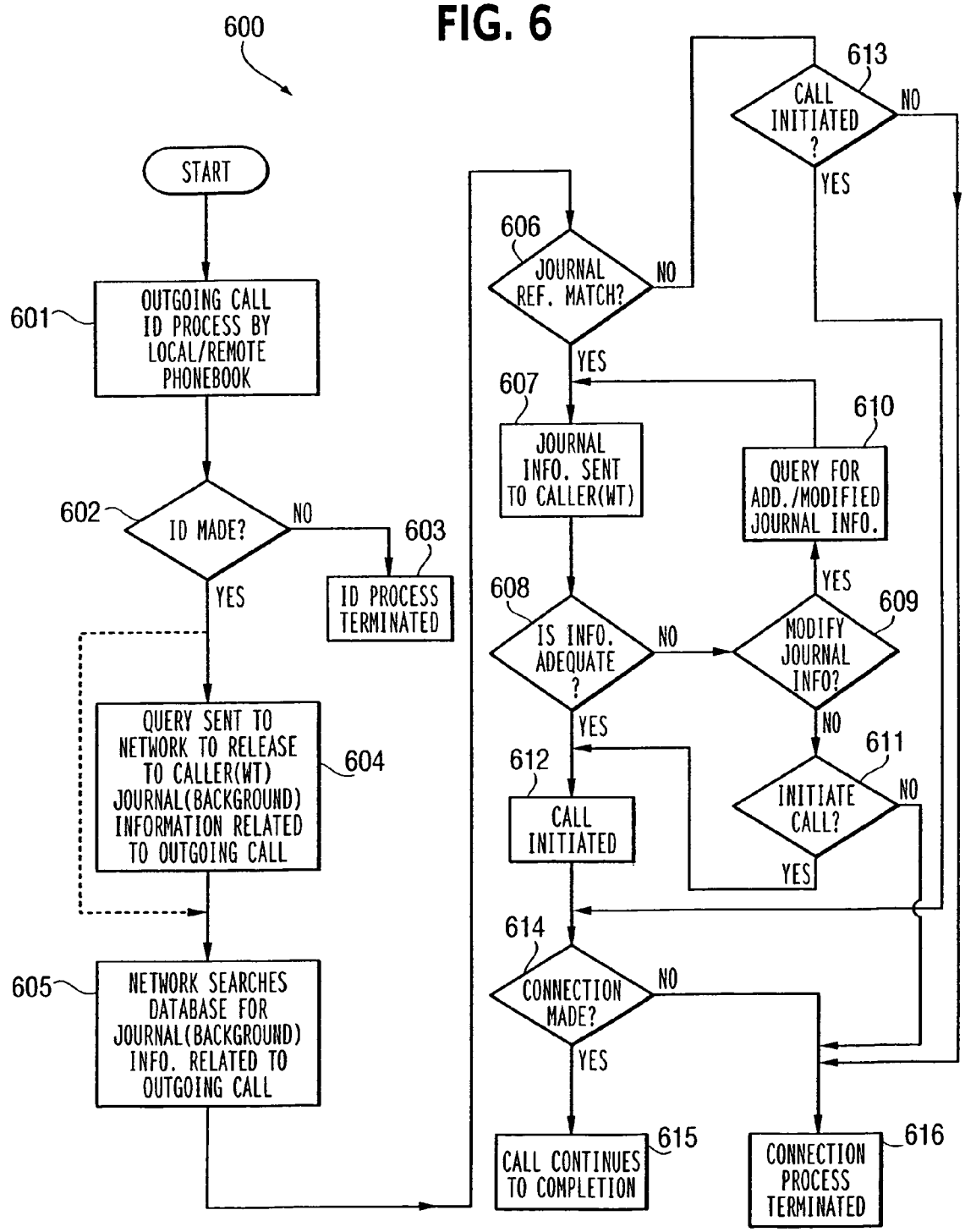
FIG. 6 is a flowchart of a first example for providing a wireless terminal access to a journal database of a system or network according to the present invention.

Process 600 in FIG. 6 is an example of a process 600 of implementing a journal viewing application in conjunction with an outgoing call ID process (601), such as with regard to FIGS. 4 and 5 of the drawings, although not limited thereto. If the phone number/destination directed to an outgoing call has not been located in either the local or in the remote network phonebook (602), the ID process is terminated (603) and journal viewing application for obtaining background information directed to the call to be made is not made. If the outgoing call ID process is successful, (602), the network automatically commences with searching of the database for background information related to the outgoing call to be made (this is featured by the dashed line and process 605 in FIG. 6). Alternatively, if instructions to start a search query is begun by the wireless terminal user, once an outgoing call ID is made, then a query is sent to the network to release to the caller at the user terminal background information related to the outgoing call (604), and this is followed by a search being performed of the database for background information (605). If the network search for journal (background) information is successful (606), the journal information is sent (released) to the caller at the Wireless Terminal (WT)(607). As to the background information, if the caller considers the information adequate, (608), an outgoing call is then initiated by the network (612) which is followed by the completing of a phone connection (614) in which case the call continues until completion (615) or the connection process is terminated (616) and the connection is not made. However, if the journal information sent to the caller is inadequate or the caller wishes to have the information organized in the manner that would be presently relevant to him or her, then the caller, using the UI at the user terminal, can send instructions/query to modify the journal information (609–610). This can be repeated a number of times, especially, in connection with a call to be initiated since time is more plentiful for the caller to view the screen at the user terminal before making the actual call.

Referring to the flow chart in FIG. 6, if the journal viewing application cannot be effected as a result of not finding background information in the journal database (606), then the caller (terminal user) has the option of either making a connection (614) or terminating the connection process (616). Also, as long as an ID is made of the person or party to be called, for example, in connection with the phonebook application, a call may be initiated (611) irrespective of whether a journal viewing application is successful.

Regarding the journal database, the type of background information that is held therein may be previous phone calls, originating and terminating, including dates, times and durations; all prior E-mails; task lists; documents associated with originating or terminating call; a project; a calendar data; and the company or plant related to client or professional contact information, and the like, although not limited thereto. Modifying/organizing of the journal information may be effected using Call Line Identification Presentation (CLIP) which works as a filter by getting all the relevant information that the user has chosen for his or her immediate need. In this connection, a filter and/or organized background information may include a selected number of last calls (originating and terminating) including dates, times and durations; task headings; E-mail headings; and related documents, although not limited thereto. The caller (terminal user) may also specify the time period from which the related documents originate and/or the number of call related items to be viewed on the screen. For example, when calling Mr. William Smith, the user specifies for the journal to release the five last phone calls, three E-mail headings, three task headings as well as related documents prepared in the last month.

The results of the phonebook application may be displayed on a viewer screen of the wireless terminal and the results presented may be browsed on the screen. An example of this is given in FIG. 8 of the drawings showing a viewer screen 800 of a list of individuals along with their pictures which relate to the search criteria associated with a phonebook application query to the network database. Through a browsing application, all individuals selected on the basis of the search criteria can be viewed such as using a scroll bar 801. The FIG. 8 example shows those individuals, in alphabetical order, which meet the search criteria "Company X, Sales and Symbol Marketing Department."

Figure 9:
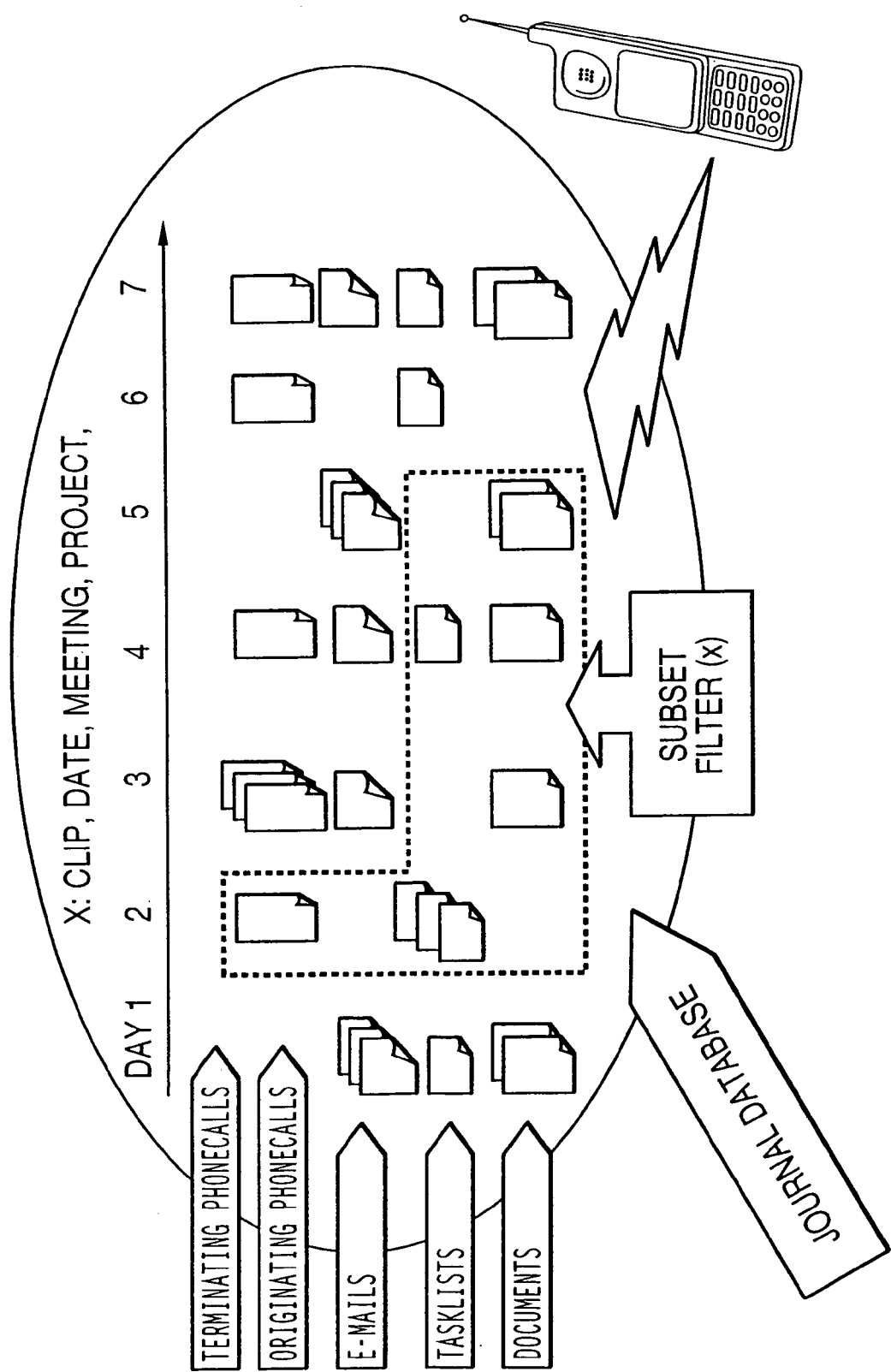
FIG. 9 is an example of the journal database providing the wireless terminal user appropriate organized background information related to an originating or terminating call according to the present invention.

FIG. 9 of the drawings illustrates a journal database having background information which may be filtered and organized such as by using a Call Line Identification Presentation (CLIP) for viewing by the caller (terminal user). Such information is available for an originating call in connection with the process 600 in FIG. 6 as well as with regard to terminating calls (incoming calls) which will be further discussed with regard to FIG. 7 of the drawings.

Figure 7:
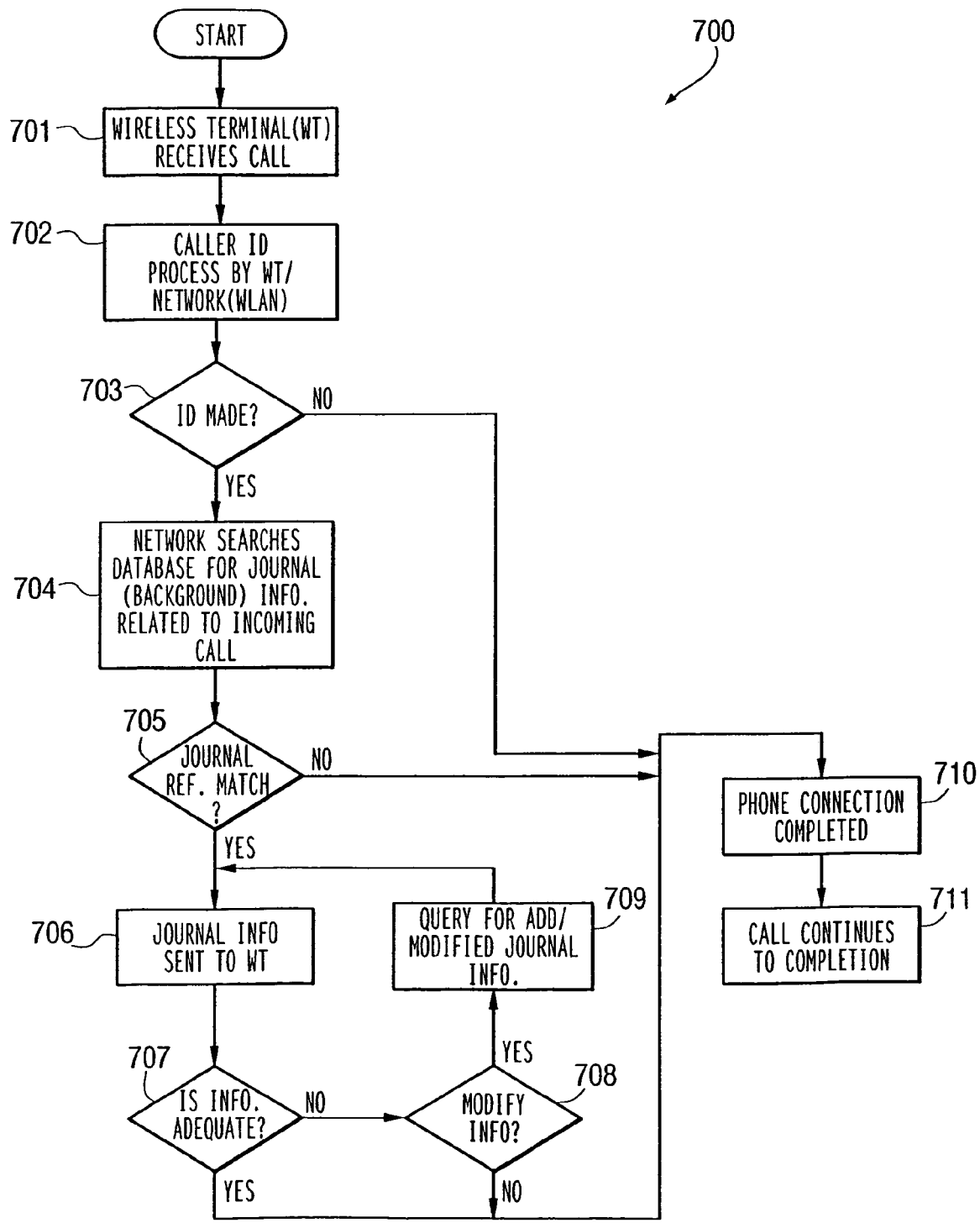
FIG. 7 is a flowchart of a second example for providing a wireless terminal access to a journal database of a system or network according to the present invention.

FIG. 7 of the drawings shows a second example in which a user terminal is provided online access to a journal database of a system or network such as WLAN in connection with an incoming call. A process 700 features a journal viewing application in response to a caller identification associated with an incoming call to a wireless terminal. The caller ID process involving 701, 702 and 703 may involve a phonebook application process such as discussed with regard to FIGS. 2 and 3 of the drawings, although not limited thereto. If the caller identity is found, the network then automatically searches the network for journal (background) information related to the incoming call (704). If a match is found in the journal database, the background information associated therewith is sent to the wireless terminal for viewing by the user (706) and if the terminal user needs additional information, a process similar to 608, 609 and 610 is effected in connection with 707, 708 and 709 in FIG. 7.

In accordance with incoming calls, the wireless terminal user (of the incoming call) may want to request for additional or modified background information, namely, organized and filtered information, such as discussed with regard to FIGS. 6 and 9, after a phone connection is established rather than before the phone connection is completed, the latter being shown with regard to FIG. 7. In order to be able to view the screen as well as communicate by voice, there must be a hands-free facility for the terminal user. This can be achieved through using a headphone while viewing/browsing a screen such as a palmtop device or, for that matter, a notebook computer which works wirelessly and which may be hooked up with the headphone. In FIG. 7, irrespective of whether a caller identification of an incoming call is made or whether a journal viewing application is successful, a phone connection may still be completed (710, 711).

Figure 10:
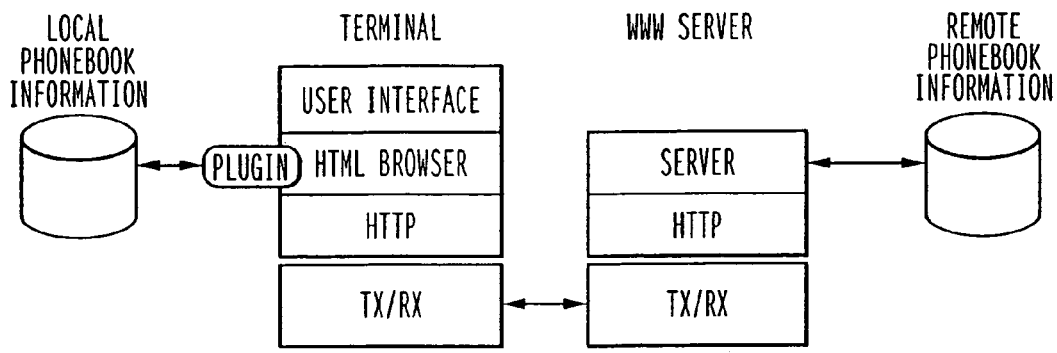
FIG. 10 is a first example of a protocol application at the user terminal end and server end of a system or network according to the present invention.
Figure 11:
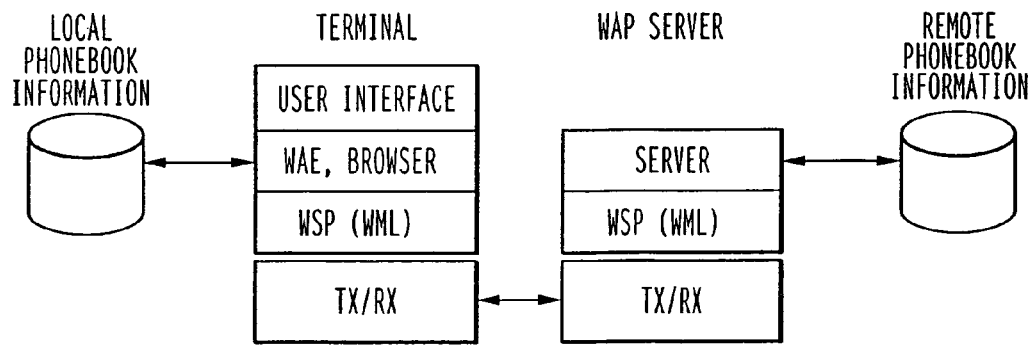
FIG. 11 is a second example of a protocol application at the user terminal end and server end of a system or network according to the present invention.
Figure 12:
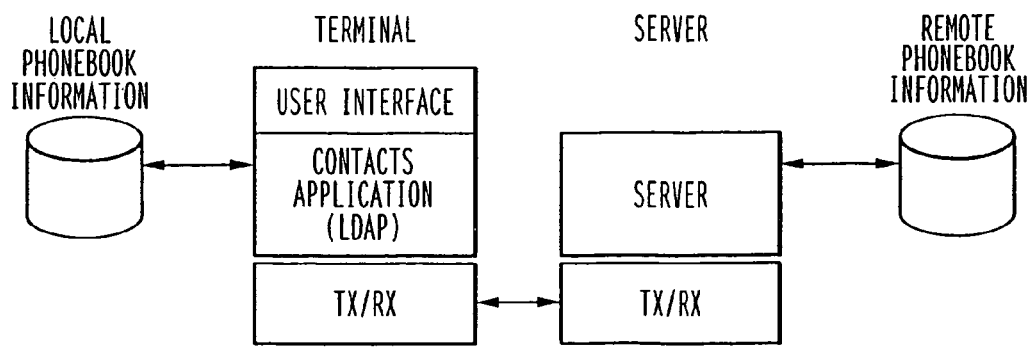
FIG. 12 is a third example of a protocol application at the user terminal end and server end of a system or network according to the present invention.

FIGS. 10, 11 and 12 are three examples (although not limited thereto) of employing a protocol application at the user terminal end and server end of the communication system or network such as WLAN in connection with the present invention. In each of these figures, the local phonebook information is stored at the user terminal side and may be a storage medium such as of flash memory (flash disk) variety while the remote phonebook information is located at the network where it is accessible by a server having access thereto.

With regard to the embodiment in FIG. 10, this involves a phonebook application which is a World Wide Web (WWW) IP-based application using Hypertext Transfer Protocol (HTTP) to transmit information between the wireless terminal and the web server and, moreover, using a Hypertext Markup Language (HTML) browser to query the local phonebook such as in the wireless terminal. According to this approach, the transport interface employed is an HTTP interface which allows communication between the user terminal and the web server which has access to the network phonebook (journal database). The web browser is used with a plugin in order to be able to access the local phonebook information, i.e., the phonebook data that is stored in the local storage means such as a flash disk (e.g., an EEPROM flash memory disk). It is preferable that either the browser implementation or the special plugin application enables viewing the local and remote phonebooks, either separately or together. The plugin application can be further used to store any accessed (opened) remote phonebook entries (e.g., electronic business cards and the like) into the local phonebook storage medium. A plugin application is recognized automatically by the web browser and its function is integrated into the main HTML file.

Another approach for implementing the invention is shown with respect to the protocol scheme known as Wireless Application Protocol (WAP) which is a WAP browser for Wireless Application Environment (WAE) to access the information from the local phonebook in the wireless terminal. As can be seen from FIG. 11, when a WAP browser is used to access the remote as well as the local phonebooks, the following building blocks as shown in the illustration are required. A WAP browser with WAE is provided to access the local phonebook information, that is, the phonebook data stored in local storage medium, such as a flash disk (e.g., EEPROM flash memory) in the user terminal (the wireless terminal may be a palmtop device or other type of wireless terminal such as a wireless phone with display and other services as mentioned in this specification, although not limited thereto). It must also have a WAP server at the network and this may involve a Wireless Service Protocol (WSP) link-up including a Wireless Markup Language (WML)-based connection to the WAP server in the network, in which WML is part of the Wireless Application Protocol (WAP). WML, formerly called Handheld Devices Markup Language (HDML), is a language that allows the text portions of Web pages to be presented on wireless phones and PDAs via a wireless access. The WAP server is facilitated to access separately stored phonebook information which phonebook information may be stored in an ordinary Web server of the network. In the case of Wireless Access Protocol (WAP), access to both the local remote phonebook databases may be facilitated through a consistent User Interface (UI) in which the terminal user can quickly access either phonebook. The Wireless Application Environment (WAE) will need to be modified so that an automatic addition of accessed information to the local phonebook is made possible. This requires caching such that the local (offline) phonebook can be accessed using the browser even if there is no access to the remote Web/WAP server.

FIG. 12 is another example of a protocol application scheme directed to the present invention. This is basically a query-based access so that if you have a specialized UI in the wireless terminal or there is some proprietary information that does not easily fit into WAP (WML) environment, one possibility is to use a protocol application such as Lightweight Directory Access Protocol (LDAP) to fetch the information from the database and present it to the wireless terminal. In case of specialized phonebook/contacts application, basically, the same elements exist as in the case of WAP or WWW browser. In the user terminal there is a phone application working as a client while the network has a server that communicates with the client. The terminal user (client) can fetch information from the server, having the phonebook database, using either proprietary protocols or, for example, LDAP. This specialized application makes it easy to provide truly consistent access to both and local network phonebooks while using the same UI.

LDAP is particularly applicable when there is some proprietary information that does not easily fit into WAP or Web-based browsing. If, however, the existing contacts application cannot be modified, then wireless access to the network database at the server side is preferable through a WAP or web browser. In such cases, it is important to maintain and ensure that the UI look and feel remains consistent between the contacts application and the WAP/web browser. That is, the specialized or proprietary application is merged or implemented in terms of look and feel in a manner such that the person who is using the wireless terminal does not actually notice that he or she is using a special browser or a query-based application other than just the telephone itself that is all the time in the network.

This concludes the description of the example embodiments. Although the present invention has been described with reference to a number of illustrative embodiments thereof, it should be understood that numerous other modifications and examples can be devised by those skilled in the art that will fall within the spirit and scope of the principles of this invention. Also, reasonable variations and modifications are possible in the component parts and/or arrangements associated with the method and system therefor directed to the present invention that are within the scope of the foregoing disclosure, the drawings and the appended claims without departing from the spirit of the invention. In addition to variations and modifications that are possible, alternative uses will also be apparent to those skilled in the art.

What is claimed is:

1. A method for providing a wireless terminal of a communication system access to at least a phonebook database of the system, the method comprising:
   (a) for incoming phone calls to said wireless terminal
      identifying a phone number of a caller at said wireless terminal;
      instructing the system to perform a caller identity search by searching said phonebook database to identify a name of the caller; and
      sending results of the caller identity search to said wireless terminal, such that
      (i) if the caller identity search is successful, an identification of the caller is presented at said wireless terminal, and
      (ii) if the caller identity search is not successful, the caller phone number is presented at said wireless terminal, and
   (b) for outgoing calls to be made from said wireless terminal
      instructing the system to search said phonebook database to locate at least one of a phone number and destination of an outgoing call; and
      sending results of the search to said wireless terminal such that
      (i) if the phone number or destination of the outgoing call to be made is found in the phonebook database, the same is presented at said wireless terminal, and
      (ii) if the phone number or destination is not found in an initial search query of the phonebook database, the wireless terminal user, is presented with an opportunity to modify the search query of the system to the phonebook database or terminate a caller identification process,
   wherein identification of the caller of an incoming call or the phone number or the destination to be called includes showing at least one of the name and an affiliation and, when stored in the phonebook database, showing a picture of a person on a display of said wireless terminal.

2. A method for providing a wireless terminal of a communication system access to at least a phonebook database of the system, the method comprising:
   (a) for incoming phone calls to said wireless terminal
      identifying a phone number of a caller at said wireless terminal;
      instructing the system to perform a caller identity search by searching said phonebook database to identify a name of the caller; and
      sending results of the caller identity search to said wireless terminal, such that
      (i) if the caller identity search is successful, an identification of the caller is presented at said wireless terminal, and
      (ii) if the caller identity search is not successful, the caller phone number is presented at said wireless terminal, and
   (b) for outgoing calls to be made from said wireless terminal
      instructing the system to search said phonebook database to locate at least one of a phone number and destination of an outgoing call; and
      sending results of the search to said wireless terminal such that
      (i) if the phone number or destination of the outgoing call to be made is found in the phonebook database, the same is presented at said wireless terminal, and
      (ii) if the phone number or destination is not found in an initial search query of the phonebook database, the wireless terminal user is presented with an opportunity to modify the search query of the system to the phonebook database or terminate a caller identification process,
   wherein said communication system comprises a Wireless Local Area Network (WLAN) and said phonebook database is provided in the network, and
   wherein the instruction to search said phonebook database to identify the name of the caller of said incoming call or the instruction to search said phonebook database to locate at least one of the phone number and the destination of said outgoing call to be made is effected over said WLAN and an Internet Protocol (IP)-based online link-up of said wireless terminal and the network and comprises:
      instructing the system; to start a phonebook application, and
      performing a search query of said phonebook database to identify the caller of the incoming call or performing one or a successive number of new or modified search queries through a user interface (UI) provided at said wireless terminal to locate the phone number and the destination of the outgoing call to be made.

3. The method according to claim 2, wherein said phonebook application is commenced in response to, for an incoming call, the phone number being determined not to be locally stored in said wireless terminal and, for an outgoing call, at least one of phone number and destination of the outgoing call to be made being determined not to be locally stored in said wireless terminal.

4. The method according to claim 2, wherein said phonebook application is a World Wide Web (WWW) IP-based application using Hypertext Transfer Protocol (HTTP) to transmit information between said wireless terminal and a WWW server having access to the phonebook database, and using a Hypertext Mark-Up Language (HTML) browser to query a database in said wireless terminal.

5. The method according to claim 2, wherein said phonebook application is a Wireless Application Protocol (WAP)-based phonebook application using a WAP browser for Wireless Application Environment (WAE) to access a database in said wireless terminal and a protocol application to access a WAP or WWW server having access to said phonebook database.

6. The method according to claim 2, wherein said phonebook application is a query-based contacts application in which Lightweight Directory Access Protocol (LDAP) is used to transmit information between said wireless terminal and a Directory System Agent (DSA) server having access to said phonebook database.

7. The method according to claim 2, wherein listings of matched contents associated with each said query are viewed at a user terminal so that a client requesting information can make a selection from the listings or instruct the system to make a new or modified query to the phonebook database.

8. The method according to claim 7, wherein individual query outcomes are viewed through a browsable window at a user terminal.

9. A method for providing a wireless terminal of a communication system access to at least a phonebook database of the system, the method comprising:

(a) for incoming phone calls to said wireless terminal
identifying a phone number of a caller at said wireless terminal;
instructing the system to perform a caller identity search by searching said phonebook database to identify a name of the caller; and
sending results of the search to said wireless terminal, such that
(i) if the caller identity search is successful, an identification of the caller is presented at said wireless terminal, and
(ii) if the caller identity search is not successful, the caller phone number is presented at said wireless terminal, and (b) for outgoing calls to be made from said wireless terminal
instructing the system to search said phonebook database to locate at least one of a phone number and destination of an outgoing call; and
sending results of the search to said wireless terminal such that
(i) if the phone number or destination of the outgoing call to be made is found in the phonebook database, the same is presented at said wireless terminal, and
(ii) if the phone number or destination is not found in an initial search query of the phonebook database, the wireless terminal user is presented with an opportunity to modify the search query of the system to the phonebook database or terminate a caller identification process, wherein said phonebook database is available wirelessly to the user terminal through a secured online access and comprises phone number(s), address(es), name and picture, if available, and profile information of personnel or clients of a company or corporation, a company plant, or organization or association, and wherein the phone numbers in said phonebook database comprise phone numbers of office phones, facsimile phones, cell and mobile phones, pagers and handheld devices including PDAs (Personal Digital Assistants) and palm units with and without voice capability, said phonebook database further comprising contact addresses and terminal addresses including E-mail addresses of desktop and portable computers.

10. The method according to claim 9, wherein said search query associated with the outgoing call to be made is limited by search criteria employed, said search criteria comprising any one or more items from the list consisting of:

a name and contact information including address, phone number(s), facsimile number(s), or an E-mail address; a title of person in a company or organization; a unit, plant or branch of a company; a project group or work team; a building or site location; a picture of a person; and a person's administrative assistant.

11. A method for providing a wireless terminal of a communication system access to at least a phonebook database of the system, the method comprising:

(a) for incoming phone calls to said wireless terminal
identifying a phone number of a caller at said wireless terminal;
instructing the system to perform a caller identity search by searching said phonebook database to identify a name of the caller; and
sending results of the search to said wireless terminal, such that
(i) if the caller identity search is successful, an identification of the caller is presented at said wireless terminal, and
(ii) if the caller identity search is not successful, the caller phone number is presented at said wireless terminal, and (b) for outgoing calls to be made from said wireless terminal
instructing the system to search said phonebook database to locate at least one of a phone number and destination of an outgoing call; and
sending results of the search to said wireless terminal such that
(i) if the phone number or destination of the outgoing call to be made is found in the phonebook database, the same is presented at said wireless terminal, and
(ii) if the phone number or destination is not found in an initial search query of the phonebook database, the wireless terminal user is presented with an opportunity to modify the search query of the system to the phonebook database or terminate a caller identification process, and further comprising:
providing a journal viewing application in which said communication system searches a journal database for background information associated with at least one of the caller of the incoming phone call and a phone number or person or of the outgoing call to be made and sends results of the background information search to said wireless terminal.

12. The method according to claim 11, wherein the background information stored in said journal database which is available to a user terminal of said system, including said wireless terminal, comprises:

previous originating and terminating phone calls, including dates, times and durations; E-mails; task lists; documents associated with each originating or terminating phone call; a project; a calendar date; and a company or plant associated with each originating or terminating phone call.

13. In a communication system having an infrastructure comprising at least one wireless terminal, at least one access point and a wired backbone, a method for providing to each said wireless terminal thereof online access capability to at least a phonebook database of the system, the method comprising:

instructing the system to start a phonebook application, wherein for incoming calls the phonebook application commences in response to a phone number identification at a user terminal side and for outgoing calls the phonebook application commences through a user interface (UI) of said wireless terminal; and performing a search query of said phonebook database to identify at least one of (i) a caller corresponding to a phone number identification of an incoming call and (ii) at least one of a phone number and a destination of an outgoing call to be made, wherein said communication system comprises a Wireless Local Area Network (WLAN) and said phonebook database is a network database, and wherein said phonebook application is a World Wide Web (WWW) IP-based application using Hypertext Transfer Protocol (HTTP) to transmit information between said wireless terminal and a WWW server, included in the network, having access to the phonebook database and using a Hypertext Mark-up Language (HTML) browser to query a database in said wireless terminal.

14. In a communication system having an infrastructure comprising at least one wireless terminal, at least one access point and a wired backbone, a method for providing to each said wireless terminal thereof online access capability to at least a phonebook database of the system, the method comprising:
  instructing the system to start a phonebook application, wherein for incoming calls the phonebook application commences in response to a phone number identification at a user terminal side and for outgoing calls the phonebook application commences through a user interface (UI) of said wireless terminal; and
  performing a search query of said phonebook database to identify at least one of (i) a caller corresponding to a phone number identification of an incoming call and (ii) at least one of a phone number and destination of an outgoing call to be made,
  wherein said communication system comprises a Wireless Local Area network (WLAN) and said phonebook database is a network database, and
  wherein said phonebook application is a Wireless Application Protocol (WAP)-based phonebook application using a WAP browser for Wireless Application Environment (WAE) to access a database in said wireless terminal and a transport interface to access a WAP or WWW server, included in the network, having access to said phonebook database.

15. In a communication system having an infrastructure comprising at least one wireless terminal, at least one access point and a wired backbone, a method for providing to each said wireless terminal thereof online access capability to at least a phonebook database of the system, the method comprising:
  instructing the system to start a phonebook application, wherein for incoming calls the phonebook application commences in response to a phone number identification at a user terminal side and for outgoing calls the phonebook application commences through a user interface (UI) of said wireless terminal; and
  performing a search query of said phonebook database to identify at least one of (i) a caller corresponding to a phone number identification of an incoming call and (ii) at least one of a phone number and a destination of an outgoing call to be made,
  wherein said communication system comprises a Wireless Local Area Network (WLAN) and said phonebook database is a network database, and
  wherein said phonebook application is a query-based contacts application in which Lightweight Directory Access Protocol (LDAP) is used to transmit information between said wireless terminal and a Directory System Agent (DSA) server, included in the network, having access to said phonebook database.

16. In a communication system having an infrastructure comprising at least one wireless terminal, at least one access point and a wired backbone, a method for providing to each said wireless terminal thereof online access capability to at least a phonebook database of the system, the method comprising:
  instructing the system to start a phonebook application, wherein for incoming calls the phonebook application commences in response to a phone number identification at a user terminal side and for outgoing calls the phonebook application commences through a user interface (UI) of said wireless terminal; and
  performing a search query of said phonebook database to identify at least one of (i) a caller corresponding to a phone number identification of an incoming call and (ii) at least one of a phone number and destination of an outgoing call to be made,
  wherein said communication network comprises a Wireless Local Area Network (WLAN) and said phonebook database is provided in the network, and
  wherein said phonebook application is performed using a protocol application comprising an application taken from the list consisting of Wireless Application Protocol (WAP), Hypertext Transfer Protocol (HTTP), and Lightweight Directory Access Protocol (LDAP).

17. In a communication system having an infrastructure comprising at least one wireless terminal, at least one access point and a wired backbone, a method for providing to each said wireless terminal thereof online access capability to at least a phonebook database of the system the method comprising:
  instructing the system to start a phonebook application, wherein for incoming calls the phonebook application commences in response to a phone number identification at a user terminal side and for outgoing calls the phonebook application commences through a user interface (UI) of said wireless terminal; and
  performing a search query of said phonebook database to identify at least one of (i) a caller corresponding to a phone number identification of an incoming call and (ii) at least one of a phone number and destination of an outgoing call to be made,
  wherein said phonebook application is commenced in response to, for an incoming call, the phone number being determined not to be locally stored in said wireless terminal and, for an outgoing call, at least one of the phone numbers and destination of the outgoing call to be made being determined not to be locally stored in said wireless terminal.

18. In a communication system having an infrastructure comprising at least one wireless terminal, at least one access point and a wired backbone, a method for providing to each said wireless terminal thereof online access capability to at least a phonebook database of the system, the method comprising,
  instructing the system to start a phonebook application, wherein for incoming calls the phonebook application commences in response to a phone number identification at a user terminal side and for outgoing calls the phonebook application commences through a user interface (UI) of said wireless terminal; and
  performing a search query of said phonebook database to identify at least one of (i) a caller corresponding to a phone number identification of an incoming call and (ii) at least one of a phone number and destination of an outgoing call to be made, wherein said search query associated with the outgoing call to be made comprises:
  at least one query, based on search criteria sent through the user interface of said wireless terminal, to find at least one of a phone number and a name of a person or party to be called, said search query conforming to a Wireless Local Area Network (WLAN)-based transport protocol or a WLAN-based protocol over the internet and performed by a server in the network having access to said phonebook database.

19. The method according to claim 18,
  wherein said phonebook database is available wirelessly to a user terminal through a secured online access over the internet and comprises phone number(s), name and profile information of personnel or clients of a company or corporation, a company plant, or organization or association, and wherein the phone numbers in said phonebook database comprise phone numbers of office phones, facsimile phones, cell and mobile phone, pagers and handheld devices including Personal Digital Assistants (PDAs) and palm units with and without voice capability, said phonebook database further comprising contact addresses and terminal addresses including E-mail addresses of desktop and portable computers.

20. The method according to claim 19, wherein said search criteria of said search query associated with the outgoing call to be made contains any one or more items from the list consisting of: a name and contact information including address, phone number(s), facsimile number(s), or an E-mail address; a title of a person in a company or organization; a unit, plant or branch of a company; a project group or work team; a building or site location; a picture of a person; and a person's administrative assistant.

21. The method according to claim 18, wherein listings of matched contents associated with each said query are viewed at a user terminal so that a client requesting information can make a selection from the listings or instruct the system to make a new or modified query to the phonebook database.

22. In a communication system having an infrastructure comprising at least one wireless terminal, at least one access point and a wired backbone, a method for providing to each said wireless terminal thereof online access capability to at least a phonebook database of the system, the method comprising:

instructing the system to start a phonebook application, wherein for incoming calls the phonebook application commences in response to a phone number identification at a user terminal side and for outgoing calls the phonebook application commences through a user interface (UI) of said wireless terminal;

performing a search query of said phonebook database to identify at least one of (i) a caller corresponding to a phone number identification of an incoming call and (ii) at least one of a phone number and destination of an outgoing call to be made, and said method further comprising:

providing a journal viewing application in which said communication system searches a journal database for background information associated with at least one of a caller of an incoming phone call and a phone number of a person or party of an outgoing call to be made and sends results of the background information search to said wireless terminal, wherein the background information stored in said journal database available to a user terminal of said system, including said wireless terminal, and comprises previous originating and terminating phone calls, including dates, times and durations; E-mails; task lists; documents associated with originating or terminating call; a project; a calendar data; and a company or plant associated with each originating or terminating phone call.

23. A method for providing a wireless terminal of communication system access to at least a journal database, the method comprising:

instructing the system to start a journal viewing application to obtain background information related to an occurrence of an incoming call or an outgoing call to be made; and performing a search query of said journal database to locate the background information, the search query including a call identification process in which either an incoming call phone number or at least one of a phone number and a name of a person or party of the outgoing call to be made is matched to the background information associated therewith in said journal database; and presenting the matched background information to said wireless terminal, wherein the background information is stored in said journal database and is available to a user terminal of said system, including said wireless terminal, and comprises:

previous originating and terminating phone calls, including dates, times and durations; E-mails; task lists; documents associated with each originating or terminating phone call; a project; a calendar data; and a company or plant associated with each originating or terminating phone call.

24. The method according to claim 23, wherein the background information presented to said wireless terminal is filtered and organized, including having headings, through settings chosen by the terminal user, and wherein the filtered settings may be varied for the originating and terminating phone calls.

25. The method according to claim 24, wherein information displayed on the wireless terminal comprises:

the recent originating and terminating phone calls; task headings; E-mail headings; and related documents.

26. A method for providing a wireless terminal of communication system access to at least a journal database, the method comprising:

instructing the system to start a journal viewing application to obtain background information related to an occurrence of an incoming call or an outgoing call to be made; and performing a search query of said journal database to locate the background information, the search query including a call identification process in which either an incoming call phone number or at least one of a phone number and a name of a person or party of the outgoing call to be made is matched to the background information associated therewith in said journal database; and presenting the matched background information to said wireless terminal, wherein said journal viewing application is a World Wide Web (WWW) IP-based application using Hypertext Transfer Protocol (HTTP) to transmit information between said wireless terminal, and a WWW server, included in the network, having access to said journal database and using a Hypertext Mark-up Language (HTML) browser to query a database in said wireless terminal.

27. A method for providing a wireless terminal of a communication system access to at least a journal database, the method comprising:

instructing the system to start a journal viewing application to obtain background information related to occurrence of an incoming call or an outgoing call to be made; and performing a search query of said journal database to locate the background information, the search query including a call identification process in which either an incoming call phone number or at least one of a phone number and a name of a person or party of the outgoing call to be made is matched to background information associated therewith in said journal database; and presenting the matched background information to said wireless terminal, wherein said journal viewing application is a Wireless Application Protocol (WAP)-based application using a WAP browser for Wireless Application Environment (WAE) to access a database in said wireless terminal and using a transport interface to access a WAP server, included in the network, having access to said journal database.

28. A method for providing a wireless terminal of a communication system access to at least a journal database, the method comprising:

instructing the system to start a journal viewing application to obtain background information related to occurrence of an incoming call or an outgoing call to be made; and performing a search query of said journal database to locate the background information, the search query including a call identification process in which either an incoming call phone number or at least one of a phone number and a name of a person or party of the outgoing call to be made is matched to background information associated therewith in said journal database; and presenting the matched background information to said wireless terminal, wherein said journal viewing application is a query-based contacts application in which Lightweight Directory Access Protocol (LDAP) is used to transmit information between said wireless terminal and a Directory System Agent (DSA) server, included in the network, having access to said journal database.

29. A system to provide a wireless terminal of a network access to a phonebook database of the network, the system comprising:

the network, which has at least one server and at least a phonebook database;

at least one wireless terminal each of which is operably connected to said network;

at least one transport interface to allow communication between each wireless terminal and said network; and a phonebook application, included in said network, said phonebook application being such that (a) for an incoming call, the network is instructed to search said phonebook database to identify a name of a caller, and (b) for an outgoing call, the network is instructed to search said phonebook database to locate at least one of a phone number and a name of a person or party of the outgoing call to be made, wherein a result of each search is presented at said wireless terminal, wherein said network further includes a journal viewing application and a journal database, said journal viewing application instructing the network to search said journal database for background information associated with at least one of the caller of the incoming call and the phone number, person, or party of the outgoing call to be made and sends results of the background information search to said wireless terminal.

30. The system according to claim 29, wherein the background information stored in said journal database which is available to each wireless terminal of said network, including said wireless terminal having display capability, comprises:

previous originating and terminating phone calls, including dates, times and durations; E-mails; task lists; documents associated with each originating or terminating phone call; a project; a calendar data; and a company or plant associated with each originating or terminating phone call.

31. The system according to claim 30, wherein contents of said phonebook database and of said journal database are available wirelessly to said wireless terminal through a secured online access over the internet, wherein said phonebook database comprises phone number(s), name and profile information of personnel or clients of a company or corporation, a company plant, or an organization or association, and wherein the phone numbers in said phonebook database comprise phone numbers of office phones, facsimile phones, cell and mobile phones, pagers and handheld devices including PDAs (Personal Digital Assistants) and palm units with and without voice capability, said phonebook database further comprising contact addresses and terminal addresses including E-mail addresses of desktop and portable computers.

32. The system according to claim 31, wherein one or more search queries associated with the outgoing call are made of said phonebook database, and each search query is limited to search criteria inputted at a User Interface (UI) of said wireless terminal and comprises any one or more items from the list consisting of:

a name and contact information including address, phone number(s), facsimile number(s), or an E-mail address; a title of person in a company or organization; a unit, plant or branch of a company; a project group or work team; a building or site location; a picture of a person; and a person's administrative assistant.

33. A system to provide a wireless terminal of a network access to a phonebook database of the network, the system comprising:

the network which has at least one server and at least a phonebook database;

at least one wireless terminal each of which is operably connected to said network;

at least one transport interface to allow communication between each wireless terminal and said network, wherein said transport interface comprises an interface taken from the list consisting of a Wireless Application Protocol (WAP) interface, a Hypertext Transfer Protocol (HTTP) interface and a Lightweight Directory Access Protocol (LDAP) interface; and a phonebook application, included in said network, said phonebook application being such that (a) for an incoming call, the network is instructed to search said phonebook database to identify a name of a caller, and (b) for an outgoing call, the network is instructed to search said phonebook database to locate at least one of a phone number and a name of a person or party of the outgoing call to be made, wherein a result of each search is presented at said wireless terminal, wherein for incoming calls said phonebook application commences in response to a phone number identification at said wireless terminal and for outgoing calls, said phonebook application commences through a user interface (UI) of said wireless terminal, and wherein said network comprises a Wireless Local Area Network (WLAN) including a plurality of wireless terminals, at least one access point, a server farm and a backbone infrastructure to support each wireless terminal, each access point and each network server.

34. A system to provide a wireless terminal of a network access to a phonebook database of the network, the system comprising:

the network which has at least one server and at least a phonebook database;

at least one wireless terminal each of which is operably connected to said network;

at least one transport interface to allow communication between each wireless terminal and said network, a phonebook application, included in said network, said phonebook application being such that (a) for an incoming call, the network is instructed to search said phonebook database to identify a name of a caller, and (b) for an outgoing call, the network is instructed to search said phonebook database to locate at least one of a phone number and a name of a person or party of the outgoing call to be made, wherein a result of each search is presented at said wireless terminal, wherein for incoming calls said phonebook application commences in response to a phone number identification at said wireless terminal and for outgoing calls, said phonebook application commences through a user interface (UI) of said wireless terminal, wherein said terminal is continuously maintained in the network to permit uninterrupted communication between said wireless terminal and a server associated with said phonebook database, and wherein said phonebook application is a World Wide Web (WWW) IP-based application using Hypertext Transfer Protocol (HTTP) to transmit information between a wireless terminal and a WWW server having the phonebook database and using a Hypertext Mark-up Language (HTML) browser to query a database in said wireless terminal.

35. A system to provide a wireless terminal of a network access to a phonebook database of the network, the system comprising:

the network which has at least one server and at least a phonebook database;

at least one wireless terminal each of which is operably connected to said network;

at least one transport interface to allow communication between each wireless terminal and said network, a phonebook application, included in said network, said phonebook application being such that (a) for an incoming call, the network is instructed to search said phonebook database to identify a name of a caller, and (b) for an outgoing call, the network is instructed to search said phonebook database to locate at least one of a phone number and a name of a person or party of the outgoing call to be made, wherein a result of each search is presented at said wireless terminal, wherein for incoming calls said phonebook application commences in response to a phone number identification at said wireless terminal and for outgoing calls, said phonebook application commences through a user interface (UI) of said wireless terminal, wherein said wireless terminal is continuously maintained in the network to permit uninterrupted communication between said wireless terminal and a server associated with said phonebook database, and wherein said phonebook application is a Wireless Application Protocol (WAP)-based phonebook application using a WAP browser for Wireless Application Environment (WAE) to access a database in a wireless terminal and transport interface to access a WAP or WWW server having access to said phonebook database.

36. A system to provide a wireless terminal of a network access to a phonebook database of the network, comprising:

the network which has at least one server and at least a phonebook database, at least one wireless terminal each of which is operably connected to said network;

at least one transport interface to allow communication between each wireless terminal and said network, a phonebook application, included in said network, said phonebook application being such that (a) for an incoming call, the network is instructed to search said phonebook database to identify a name of a caller, and (b) for an outgoing call, the network is instructed to search said phonebook database to locate at least one of a phone number and a name of a person or party of the outgoing call to be made, wherein a result of each search is presented at said wireless terminal, wherein for incoming calls said phonebook application commences in response to a phone number identification at said wireless terminal and for outgoing calls, said phonebook application commences through a user interface (UI) of said wireless terminal, wherein said wireless terminal is continuously maintained in the network to permit uninterrupted communication between said wireless terminal and a server associated with said phonebook database, and wherein said phonebook application is a query-based contacts application in which Lightweight Directory Access Protocol (LDAP) is used to transmit information between a wireless terminal and a Directory System Agent (DSA) server having access to said phonebook database.

37. A system to provide a wireless terminal of a network access to at least a journal database of the network, the system comprising:

the network which has at least one server and at least a phonebook database;

at least one wireless terminal each of which is operably connected to said network;

at least one transport interface to allow communication between each wireless terminal and said network; and a journal viewing application, included in said network, said journal viewing application detailing background information related to an incoming call or an outgoing call to be made, the journal viewing application configured to perform the following steps:

(i) performing a search query of said journal database to locate the background information, the search query including a call identification process in which either an incoming call phone number or at least one of a phone number and a name of a person or party of an outgoing call to be made is matched to background information associated therewith in said journal database, and (ii) presenting the matched background information to said wireless terminal, wherein the background information is stored in said journal database and is available to a user terminal of said system, including said wireless terminal, and comprises:

previous originating and terminating phone calls, including dates, times and durations; E-mails; task lists; documents associated with originating or terminating call; a project; a calendar data; and a company or plant associated with each originating or terminating phone call.

38. The system according to claim 37, wherein the background information presented to said wireless terminal is filtered and organized, including having headings, through settings chosen by the terminal user, and wherein the filtered settings may be varied for the originating and terminating phone calls.

39. The system according to claim 38, wherein information displayed on the wireless terminal comprises:

the recent originating and terminating phone calls; task headings; E-mail headings, and related documents.

40. The system according to claim 39, wherein said network comprises a plurality of wireless terminals, at least one access point, a server farm and a backbone infrastructure to support each wireless terminal, each access point and each network server.

41. The system according to claim 40, wherein said journal viewing application is a World Wide Web (WWW) IP-based application using Hypertext Transfer Protocol (HTTP) to transmit information between said wireless terminal and a WWW server having access to said journal database, and using a Hypertext mark-up Language (HTML) browser to query a database in said wireless terminal.

42. The system according to claim 40, wherein said journal viewing application is a Wireless Application Protocol (WAP)-based journal viewing application using a WAP browser for Wireless Application Environment (WAE) to access database in said wireless terminal and using a transport interface to access a WAP server having access to said journal database.

43. The system according to claim 40, wherein said journal viewing application is a query-based contacts application in which Lightweight Directory Access Protocol (LDAP) is used to transmit information between said wireless terminal and a Directory System Agent (DSA).

* * * * *

UNITED STATES PATENT AND TRADEMARK OFFICE
CERTIFICATE OF CORRECTION

PATENT NO.         : 7,085,257 B1
APPLICATION NO. : 09/544141
DATED                  : August 1, 2006
INVENTOR(S)        : H. Karves et al.

It is certified that error appears in the above-identified patent and that said Letters Patent is hereby corrected as shown below:

In Claim 2, Column 18, Line 19:
  Please delete "system; to" and insert -- system to --

In Claim 11, Column 20, Line 29:
  Please delete "person or of" and insert -- person or party of --

In Claim 17, Column 22, Line 18:
  Please delete "system the" and insert -- system, the --

In Claim 22, Column 23, Line 53:
  Please delete "database available" and insert -- database is available --

In Claim 33, Column 26, Line 37:
  Please delete "network which" and insert -- network, which --

In Claim 34, Column 27, Line 4:
  Please delete "network which" and insert -- network, which --

In Claim 35, Column 27, Line 39:
  Please delete "network which" and insert -- network, which --

In Claim 36, Column 28, Line 6:
  Please delete "network which" and insert -- network, which --

In Claim 37, Column 28, Line 40:
  Please delete "network which" and insert -- network, which --

Signed and Sealed this

Eighteenth Day of March, 2008

JON W. DUDAS
*Director of the United States Patent and Trademark Office*